United States Patent
Fowell et al.

(10) Patent No.: US 7,268,726 B2
(45) Date of Patent: Sep. 11, 2007

(54) METHOD AND APPARATUS FOR CORRECTION OF QUANTIZATION-INDUCED BEACON BEAM ERRORS

(75) Inventors: Richard A. Fowell, Rolling Hills Estates, CA (US); Hanching G. Wang, Hacienda Heights, CA (US)

(73) Assignee: The Boeing Company, Chicago, IL (US)

( * ) Notice: Subject to any disclaimer, the term of this patent is extended or adjusted under 35 U.S.C. 154(b) by 376 days.

(21) Appl. No.: 10/877,564

(22) Filed: Jun. 25, 2004

(65) Prior Publication Data

US 2005/0007274 A1     Jan. 13, 2005

Related U.S. Application Data

(60) Provisional application No. 60/486,625, filed on Jul. 11, 2003.

(51) Int. Cl.
    *H04B 7/185*     (2006.01)
    *H01Q 1/00*     (2006.01)

(52) U.S. Cl. .................. 342/354; 342/372; 342/359

(58) Field of Classification Search .............. None
See application file for complete search history.

(56) References Cited

U.S. PATENT DOCUMENTS

| | | | |
|---|---|---|---|
| 4,599,619 A | 7/1986 | Keigler et al. | |
| 4,688,091 A | 8/1987 | Kamel et al. | |
| 5,003,314 A * | 3/1991 | Berkowitz et al. | 342/372 |
| 5,103,232 A * | 4/1992 | Chang et al. | 342/372 |
| 5,184,139 A * | 2/1993 | Hirako et al. | 342/354 |
| 5,353,031 A | 10/1994 | Rathi | |
| 5,530,449 A | 6/1996 | Wachs et al. | |
| 5,543,801 A | 8/1996 | Shawyer | |
| 5,754,942 A | 5/1998 | Wachs | |
| 5,809,063 A | 9/1998 | Ashe et al. | |
| 5,809,087 A | 9/1998 | Ashe et al. | |
| 5,812,084 A | 9/1998 | Bonanni et al. | |
| 5,929,809 A | 7/1999 | Erlick et al. | |
| 5,929,810 A | 7/1999 | Koutsoudis et al. | |
| 5,940,032 A | 8/1999 | Passmann et al. | |
| 6,037,898 A | 3/2000 | Parish et al. | |
| 6,046,697 A | 4/2000 | Overbury et al. | |
| 6,061,019 A * | 5/2000 | Miyoshi | 342/359 |
| 6,084,545 A | 7/2000 | Lier et al. | |
| 6,127,966 A | 10/2000 | Erhage | |
| 6,157,340 A | 12/2000 | Xu et al. | |
| 6,252,542 B1 | 6/2001 | Sikina et al. | |
| 6,288,670 B1 * | 9/2001 | Villani et al. | 342/354 |
| 6,384,781 B1 | 5/2002 | Kautz et al. | |
| 6,496,143 B1 | 12/2002 | Vail et al. | |
| 6,504,502 B1 * | 1/2003 | Wu et al. | 342/354 |
| 6,522,293 B2 | 2/2003 | Vail et al. | |
| 6,535,734 B1 * | 3/2003 | Miller et al. | 455/429 |
| 6,567,040 B1 * | 5/2003 | Sevaston | 342/354 |
| 6,619,210 B1 | 9/2003 | Spivak et al. | |
| 6,720,918 B2 | 4/2004 | Reckdahl et al. | |

* cited by examiner

*Primary Examiner*—Gregory C. Issing
(74) *Attorney, Agent, or Firm*—Gates & Cooper LLP

(57) ABSTRACT

A method of correcting for beacon pointing errors is disclosed. A desired beacon value and a predicted measured beacon value are computed and used to generate the beacon correction. An antenna pattern calculator can be used to compute the predicted measured beacon value, and a beacon correction value generator can be used to compute the desired beacon value and to generate the beacon correction.

32 Claims, 24 Drawing Sheets

METHOD AND APPARATUS FOR CORRECTION OF QUANTIZATION-INDUCED BEACON BEAM ERRORS

CROSS-REFERENCE TO RELATED APPLICATIONS

This application claims benefit of U.S. Provisional Patent Application No. 60/486,625, entitled "MITIGATION OF BEAM-FORMING ERRORS DUE TO GAIN/PHASE SHIFTS AND QUANTIZATION," by Richard A. Fowell and Hanching G. Wang, filed Jul. 11, 2003, which application is hereby incorporated by reference herein.

This application is also related to the following co-pending and commonly assigned patent application(s), all of which applications are incorporated by reference herein:

Application Ser. No. 10/319,273, entitled "DIGITAL BEACON ASYMMETRY AND QUANTIZATION COMPENSATION," filed on Dec. 30, 2002, by Hanching G. Wang and Chih-Chien Hsu, Application Ser. No. 10/877,883, entitled "METHOD AND APPARATUS FOR REDUCING QUANTIZATION-INDUCED BEAM ERRORS BY SELECTING QUANTIZED COEFFICIENTS BASED ON PREDICTED BEAM QUALITY", filed on Jun. 25, 2004, by Richard A. Fowdell and Hanching G. Wang; and Application Ser. No. 10/877,443, entitled "METHOD AND APPARATUS FOR PREDICTION AND CORRECTION OF GAIN AND PHASE ERRORS IN A BEACON OR PAYLOAD", filed on Jun. 25, 2004, by Richard A. Fowell and Hanching G. Wang;

BACKGROUND OF THE INVENTION

1. Field of the Invention

The present invention relates to systems and methods for satellite navigation, and in particular to a system and method for reducing error from beacon measurements used for satellite navigation, and for reducing payload pointing error.

2. Description of the Related Art

Spacecraft typically have one or more payloads that are directed to transmit or receive energy from ground stations. For example, communication satellites include one or more uplink antennas for receiving information from an uplink center, and one or more downlink antennas for transmitting and/or receiving (transceiving) information with terrestrial transceivers. The uplink and downlink antennas are typically disposed on the satellite body (or spacecraft bus) and are directed toward a terrestrial location where an uplink/downlink antenna is transmitting/receiving the information.

In many cases, the information is beamed to and/or received from a plurality of terrestrial receivers spanning a wide geographical area. In such situations, the pointing accuracy of the uplink/downlink antennas are not particularly critical. However, in other cases, spacecraft payloads must be pointed at the desired target with a high degree of accuracy. This can be the case, for example, in cases where the uplink/downlink antenna is a narrow beamwidth antenna, or when spatial diversity is critical. In such situations, a spacecraft's on-board navigation system (which relies on inertial sensors and perhaps Sun, Earth, Moon, star, and magnetic sensors as well) often cannot support the precise pointing requirement.

In such cases, beacon sensor systems can be used to increase payload pointing performance and spacecraft body attitude accuracy. The beacon sensor system monitors an uplink carrier (which can also be used to provide commands to the satellite) to sense mispointing of the antenna structure. Using the beacon sensor data as a reference, the satellite navigational system parameters can be updated to improve accuracy. The beacon sensor data can be used to replace other sensor data.

Recent technology advances include the use of digital beacons. In a digital beacon, the beacon beams are formed digitally using an on-board Digital Signal Processor (DSP). The beacon beams are formed by selecting desired beam weights for each feed chain. However, the accuracy of the digital beacon system is negatively affected by the performance limitations of the digital beam-forming technique and its implementation. Although some digital beacon sensor errors can be ameliorated by calibration and the adjustment of weighting to beacon sensor channels (beamweights), asymmetry errors due to beam-forming approximation by finite number of feed chains, quantization errors due to the finite-bit representation of the weighting factors themselves, and errors in the gain and phase calibration of each of the beacon sensor channels can severely impact beacon accuracy and therefore payload pointing accuracy. What is needed is a system and method for compensating for such asymmetry error and quantization errors. The present invention satisfies this need.

SUMMARY OF THE INVENTION

To address the requirements described above, the present invention discloses a method and apparatus for correcting for beacon pointing errors. In one embodiment, the method comprises the steps of computing a desired beacon value, computing a predicted measured beacon value, and generating a beacon correction at least in part from the desired beacon value and the predicted measured beacon value. In another embodiment, the invention is expressed as an apparatus comprising an antenna pattern calculator, for computing a predicted measured beacon value, and a beacon correction value generator, for computing a desired beacon value, and for generating a beacon correction at least in part from the desired beacon value and the predicted measured beacon beam value.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
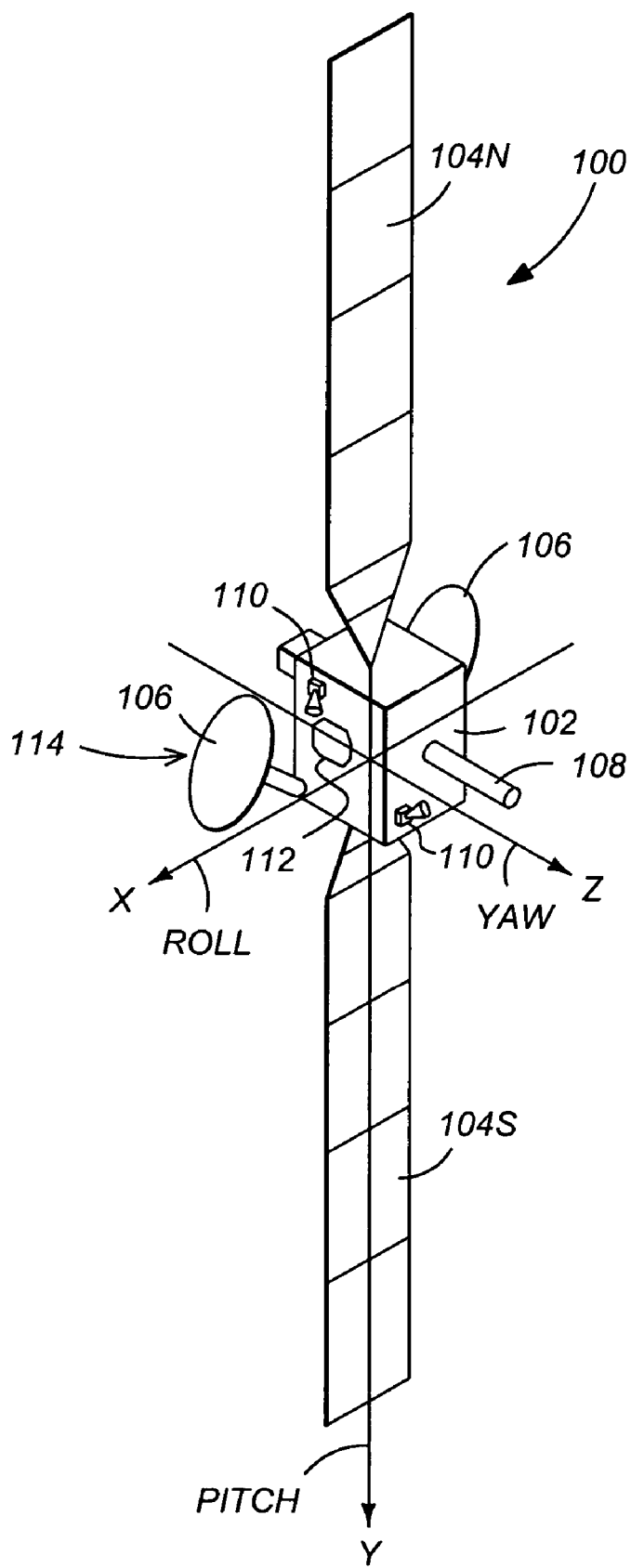
FIG. 1 is a diagram of a satellite.

FIG. 1 illustrates a three-axis stabilized satellite or spacecraft 100. The spacecraft 100 is preferably situated in a stationary orbit about the Earth. The satellite 100 has a main body 102, a pair of solar panels 104, one or more of high gain narrow beam antennas 114, which are used to communicate information with terrestrially based transceivers. In the illustrated embodiment, each antenna 114 comprises a reflector 106 and an associated feed array 112. The spacecraft may also comprise a telemetry and command omnidirectional antenna 108 which is aimed at a control ground station. The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1 are referred to by the numerals 104N and 104S for the "North" and "South" solar panels, respectively.

The three axes of the spacecraft 100 are shown in FIG. 1. The pitch axis Y lies along the plane of the solar panels 140N and 140S. The roll axis X and yaw axis Z are perpendicular to the pitch axis Y and lie in the directions and planes shown. The antenna 108 points to the Earth along the yaw axis Z.

Figure 2:
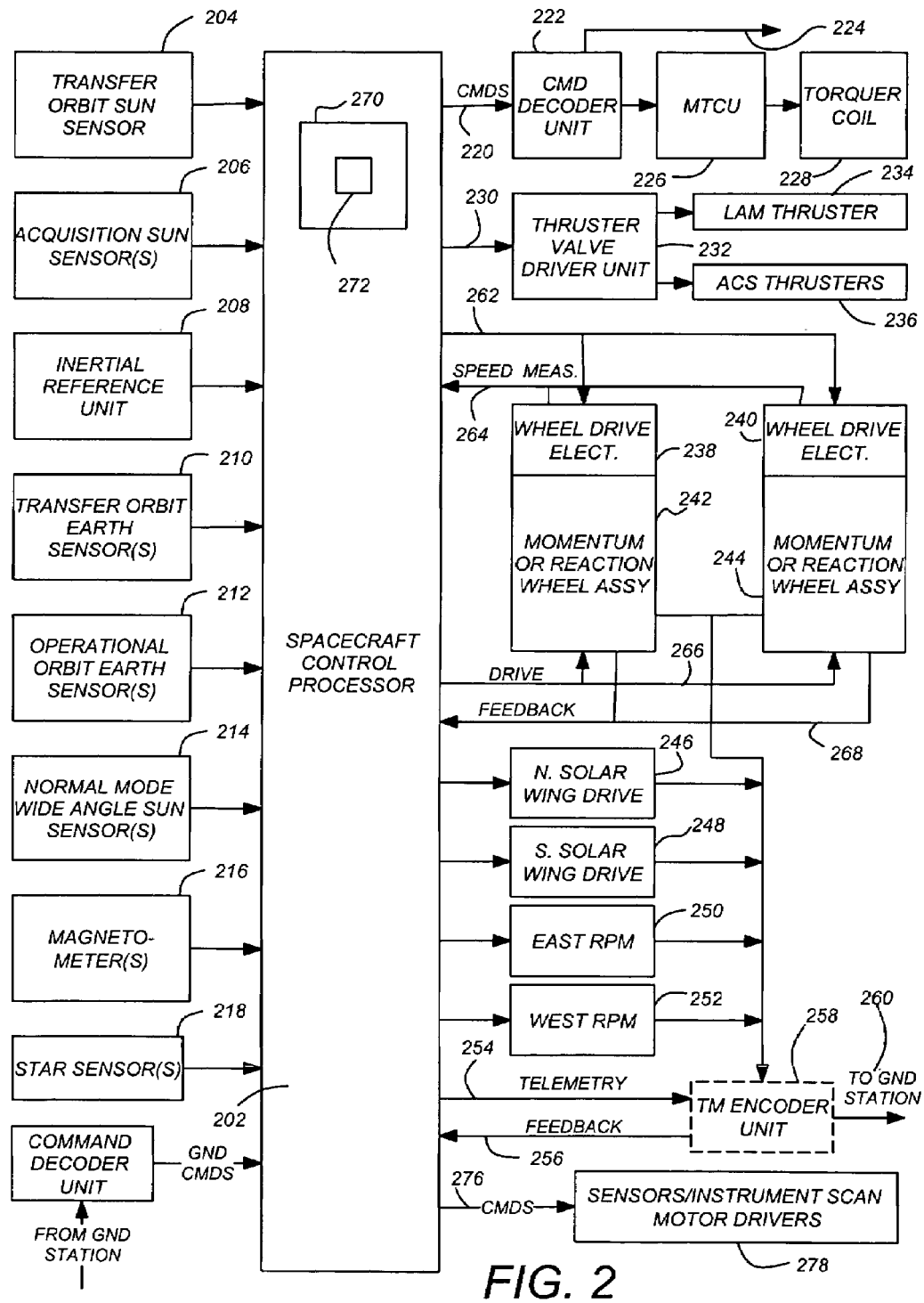
FIG. 2 is a diagram of an exemplary satellite attitude control system.

FIG. 2 is a diagram depicting the functional architecture of a representative attitude control system. Control of the spacecraft is provided by a computer or spacecraft control processor (SCP) 202. The SCP performs a number of functions which may include post ejection sequencing, transfer orbit processing, acquisition control, stationkeeping control, normal mode control, mechanisms control, fault protection, and spacecraft systems support, among others. The post ejection sequencing could include initializing to ascent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The stationkeeping control could include auto mode sequencing, stationkeeping attitude control and transition to normal mode. The normal mode control could include gyro calibration, attitude estimation, attitude and solar array steering, momentum bias control, magnetic torquing, and thruster momentum dumping (H-dumping). The mechanism's mode control could include solar panel control and reflector positioning control. The spacecraft control systems support could include telemetry and command processing, battery charge management, heater control and pressure transducer processing.

Input to the spacecraft control processor 202 may come from any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218. Ground commands are also input into the spacecraft control processor. These commands determine the control functions of the processor and the scan patterns of some instruments and sensors.

The SCP 202 generates control signal commands 220 which are directed to a command decoder unit 222. The command decoder unit operates the load shedding and battery charging systems 224. The command decoder unit also sends signals to the magnetic torque control unit (MTCU) 226 and the torquer coil 228.

The SCP 202 also sends control commands 230 to the thruster valve driver unit 232 which in turn controls the liquid apogee motor (LAM) thruster 234 and the attitude control subsystem (ACS) thrusters 236.

Generally, the spacecraft 100 may use thrusters, momentum/reaction wheels, or a combination thereof to perform spacecraft 100 attitude control.

Wheel torque commands 262 are generated by the SCP 202 and are communicated to the wheel speed electronics 238 and 240. These effect changes in the wheel speeds for wheels in momentum/reaction wheel assemblies 242 and 244, respectively. The speed of the wheels is also measured and fed back to the SCP 202 by telemetry control signal 264.

When momentum wheel assemblies are used, the spacecraft control processor also sends jackscrew drive signals 266 to the momentum wheel assemblies 242 and 244. These signals control the operation of the jackscrews individually and thus the amount of tilt of the momentum wheels. The position of the jackscrews is then fed back through telemetry signal 268 to the spacecraft control processor. The signals 268 are also sent to the telemetry encoder unit 258 and in turn to the ground station 260. The spacecraft typically includes 4 reaction wheels, disposed to permit the application of torques in any direction, and permitting for a backup torque wheel, however, different number of momentum wheels and momentum wheels of other design may be used.

For the sake of simplification, the momentum wheel(s) will be alternatively referred to as momentum wheel(s) 242 hereinafter.

For some satellites, the spacecraft control processor 202 also commands the scan motions of various sensors and instruments. The scan timings and patterns generated by the SCP 202 are communicated via scan commands 276 to the scan motor drivers 278.

The SCP 202 also provides commands to the solar wing drives 246, 248, which manipulate solar wings 104N and 104S respectively. The solar wings 104N and 104S can be manipulated about the X axis and about the Y axis shown in FIG. 1. The SCP 202 can also step reflector positioning mechanisms (RPMs) 250 and 252 to adjust the antenna orientation. Modules 250 and 252 provide the mechanism positions to the TM encoder unit 258.

The SCP 202 also sends telemetry requests 254 to the telemetry encoder unit 258 which in turn sends feedback signals 256 to the SCP 202. This feedback loop, as with the other feedback loops to the SCP 202 described earlier, assist in the overall control of the spacecraft. The SCP 202 communicates with the telemetry encoder unit 258, which receives the signals from various spacecraft components and subsystems indicating current operating conditions, and then relays them to the ground station 260.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 100 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 270 and/or data communications devices (e.g. other devices in the spacecraft 100 or on the ground), thereby making a computer program product or article of manufacture according to the invention. As such, the terms "program storage device," "article of manufacture" and "computer program product" as used herein are intended to encompass a computer program accessible from any computer readable device or media.

Figure 3:
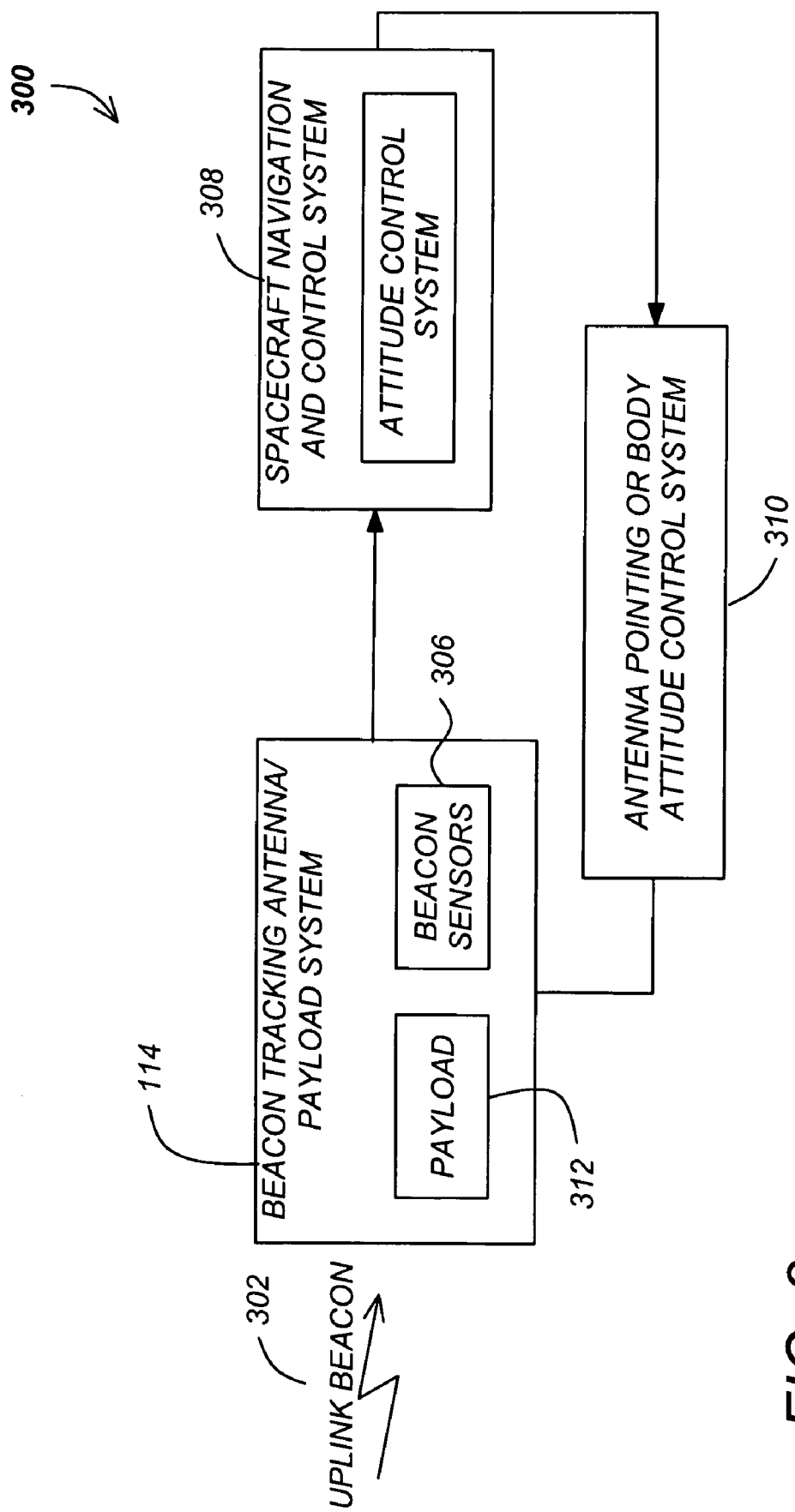
FIG. 3 is a diagram of an exemplary beacon tracking system.

FIG. 3 is a diagram of an exemplary prior art beacon tracking system 300. The beacon tracking system comprises feedback loop (which may be analog or digital) wherein a signal 302 from an uplink beacon (e.g. one of beacons 422 described in FIG. 4) is sensed by a beacon sensor 306 disposed on (or integrated with) a payload 312. In the illustrated embodiment, the beacon sensor 306 is integrated with the payload (which together comprise the antenna 114).

The antenna 114 is controlled by the antenna pointing or body attitude control system 310. The beacon sensor 306 provides one or more signals proportional to the angle that the beacon sensor's beam points away from the uplink beacon 422 to the spacecraft control system 308. The navigation and control system 308 then commands the antenna pointing or body attitude control system 310 to direct the antenna 114 and/or the spacecraft body 102 to point in a direction that accounts for the errors measured by the beacon sensors 306.

Typically, the beacon sensor 306 comprises a plurality of feed elements and related elements that are also used to implement an antenna used in the payload system 312. Also, the beacon sensor 306 is tightly coupled to the antenna 304 position and is isolated from the thermal distortions of the spacecraft bus. When implemented properly, the beacon tracking system 300 can remove the impact of slowly varying diurnal effects and orbital oscillations on pointing error.

The beacon tracking system 300 can also reduce beam pointing errors induced by yaw error because the spacecraft will yaw about the beacon site, which is close to the center of the antenna pattern, instead of the subsatellite point. Since the beacon tracking system 300 typically has better resolution than the earth sensors that are also used for satellite navigation, it also reduces noise.

Figure 4A:
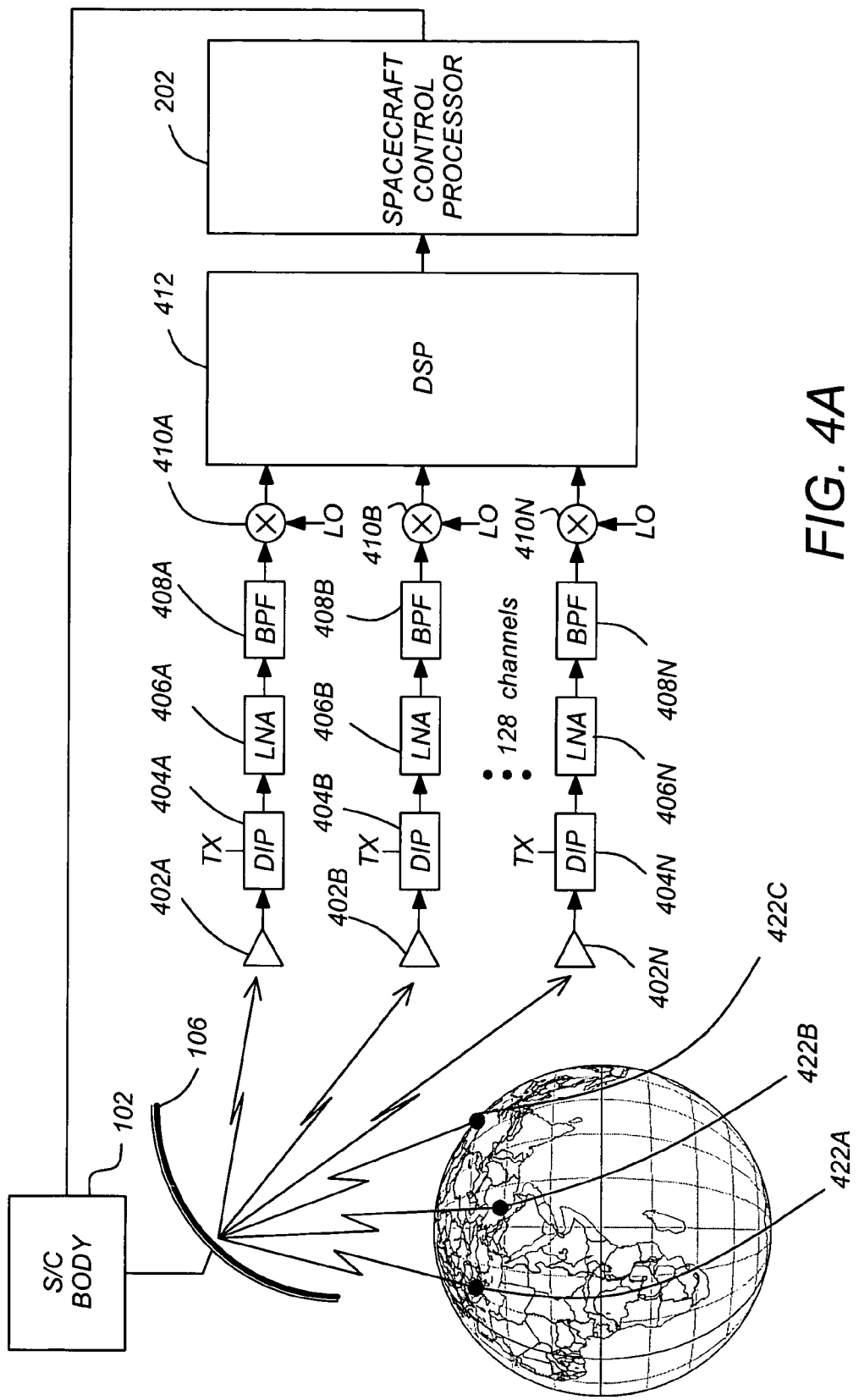
FIG. 4A is a diagram showing a digital beacon tracking system using digital beam forming technique.

FIG. 4A is a diagram showing a digital beacon tracking system using digital beam-forming technique. One or more terrestrially based uplink beacon stations (UBSs) 422A-422C hereinafter referred to alternatively as terrestrial beacons 422) transmit a signal which is reflected by a reflector 106 and sensed by N sensing feed elements 402A-402N, which collectively comprise the feed array 112 of the beacon sensor 306. Each of the uplink beacon stations 422A-422C transmits a signal on a different "channel", distinguishable from the other "channels" by time division, code division, or frequency division multiplexing techniques. Where code division multiple access techniques are used, the uplink beacon stations 422A-422C transmit a unique pseudorandom noise (PN) coded signal.

The output of each feed 402A-402N is provided to a series of elements 404A-410N, thus defining element chains or channels A-N. The output of each feed 402A-402N are provided to diplexers (DIPs) 404A-404N, thence to low noise amplifiers 406A-406N, bandpass filters 408A-408N, and then to L-band to intermediate frequency (L/IF) downconverters (D/C) 410A-410N. Elements 402A-402N are typically shared with the payload (e.g. elements 402A-402N) can also be used to receive signals from other ground-based transmitters.

The downconverted IF signal is then provided to a digital signal processor (DSP) 412, which digitizes and channelizes the signals into sub-bands of a particular bandwidth. If PN coded signals are used, the DSP 412 also acquires the PN coded signals. The DSP 412 uses uploaded beamweights for each of the channels A-N to define beams, including beacon beams and payload beams.

Figure 4B:
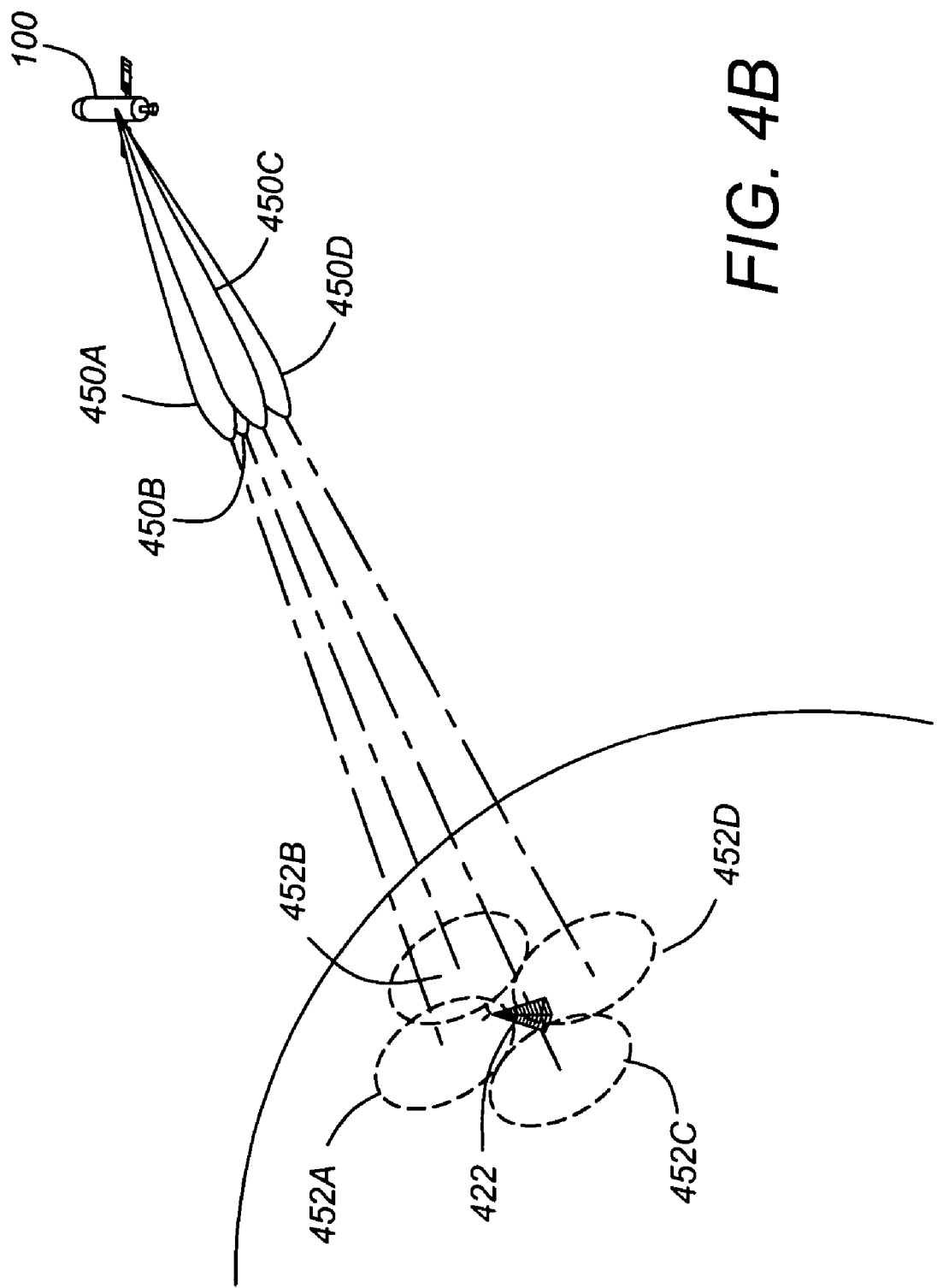
FIG. 4B is a diagram illustrating one embodiment of the beacon beams.

FIG. 4B is a diagram illustrating one embodiment of the beacon beams. In the illustrated embodiment, the DSP 412 defines four beacon beams 450A-450D which are directed generally at the uplink beacon station 422. As illustrated, each of the beacon beams 450A-450D includes a sensitivity pattern characterizable by a beam magnitude contour, which is projected onto the Earth as potentially overlapping coverage areas 452A-452D, respectively. The magnitude of the signal from the uplink beacon station 422 received in each of the beacon beams 450A-450C by the DSP 412 is provided to the SCP 202 for each of the uplink beacon station 422A-422C. Using this information, the SCP computes the azimuth and elevation angles corresponding to each UBS 422.

Mitigation of Beamforming Errors

Figure 5:
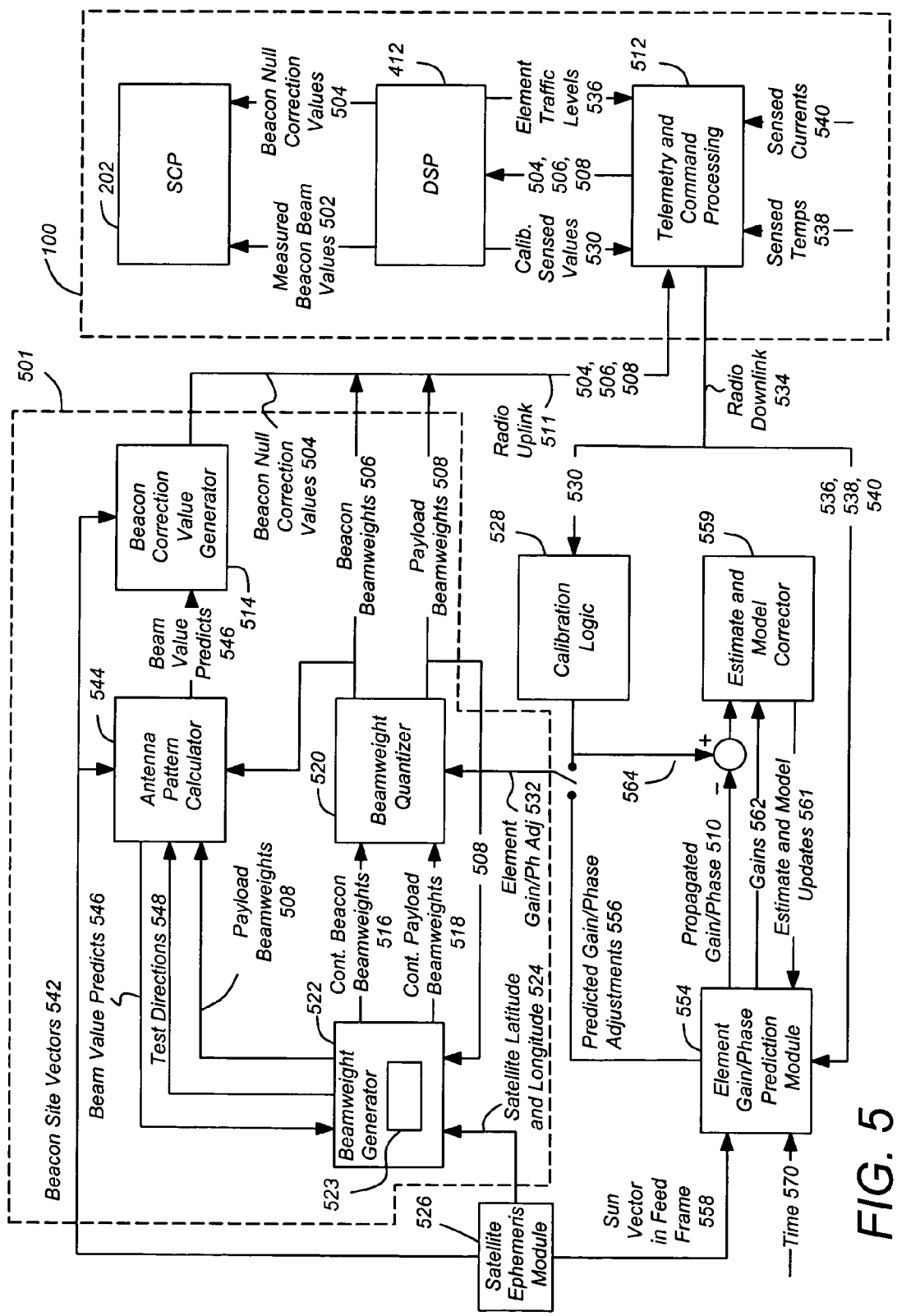
FIG. 5 is a block diagram of a system for mitigating beam forming errors.

FIG. 5 is a block diagram of a system for mitigating beam forming errors. As described above, the satellite 100 has a spacecraft control processor (SCP) 202 for controlling the pointing of the payload 312 and for performing attitude correction as previously described. In one embodiment, the payload 312 includes a feed array (or phased array) 112 payload controlled by the digital signal processor (PSP) 412 for digitally forming payload beams and beacon beams 450A-450D. The DSP 412 transmits measured beacon beam magnitude values 502 (e.g. the measured magnitude of the signals received from the beacon site 422 in each of the beacon beams 450A-450D to the SCP 202) to the SCP 202. The SCP 202 translates these measured beacon beam (magnitude) values 502 into angular errors between the aggregate beacon beams 450A-450D and the location of the beacon 422. The DSP 412 also provides beacon null correction values 504 to the SCP 202. These correction values 504 can be either in the form of corrections to the magnitudes 502 provided to the SCP 202, or corrections to the computed angular errors computed by the SCP 202. The SCP 202 determines the satellite 100 pointing attitude from the measured beacon beam values 502 corrected by the beacon null correction values 504.

The beacon null correction values 504, are computed by a beacon correction value generator 514 in a beacon beamweight correction module 501, and are uploaded to the satellite 100 via radio uplink 511. Beamweights which collectively control the orientation of the beacon beams 450A-450D (beacon beamweights) and beamweights that collectively control the angular "orientation" of the payload (payload beamweights) are also uploaded to the satellite via radio uplink 511 through telemetry and command processing 512.

In current systems, beacon correction values 504 are calculated once (a one time only calibration) to correct the apparent separation error between two sets of beacon beams (for example, separation error between the beacon beams of beacon 422A and beacon 422C), and were not varied or updated over time. The present invention, however, uses a beacon correction value generator 514 to compute and update beacon correction values as required.

Beacon beamweights 506 are used by the DSP 412 to compute the measured beacon beam values 502, while payload beamweights 508 are used by the DSP 412 to create the payload transmit and receive beam patterns. The beacon beamweights 506 and payload beamweights 508 are created from continuous beacon beamweights 516 and continuous payload beamweights 518 by a beamweight quantizer 520. In current systems, the quantizer 520 simply adjusted the continuous beamweights 516, 518 by the element (402-410) gain/phase adjustments 532, then rounded the results to the word length used by the DSP 412.

The continuous beacon beamweights 516 and continuous payload beamweights 518 are selected from a continuous beamweight table 523 based on a satellite orbital position, which can be expressed in a satellite latitude and longitude 524 generated from the satellite ephemeris 526. In current systems, the continuous beamweights 516, 518 are determined entirely by the satellite latitude and longitude for the upcoming beamweight 506, 508 update interval. The adjustments 532 are created by calibration logic 528 based on calibration sensed values 530 (sensed changes in gain and phase for channels A-N) passed over a radio downlink 534 to the calibration logic 528. One example of suitable calibration logic 528 is described in U.S. Pat. No. 5,530,449, issued to Wachs et al., which is hereby incorporated by reference herein. The downlink 534 also carries element traffic levels 536 as taught by U.S. Pat. No. 5,754,942 issued to Wachs (also hereby incorporated by reference herein) sensed temperatures 538, and sensed currents 540.

In the current designs, the calculations of the adjustments to the elements 402A-410N in the element chains (element gain/phase adjustments 532) are based only on current sensed or measured gain/phase changes in each channel. They do not use previously sensed gain/phase changes and do not consider the satellite ephemeris 526, the traffic levels 536, temperatures 538 or currents 540. Moreover, any dependence of the element gain/phase adjustments 532 on prior calibration sensed values 530 or prior adjustments 532 are simple averaging or low pass filtering, which do not have significant dependence on values more than a few hours old, and do not account for the change in the gains/phases from the effective time of estimation to the effective time of use.

Beam errors can be reduced through one or more of the following techniques, which can be used alone or in combination and are discussed in further detail below:

1. Adjust on-board satellite 100 processing of the beacon error to correct for the errors induced by the quantization of the beacon beam coefficients;

2. Reduce the quantization errors by selecting the quantized coefficients based in part on an evaluation of the effects of the quantization on beam quality;

3. Using data beyond channel element gain/phase measurements taken since the latest beamweight coefficients update to produce gain/phase element estimates, and use those estimates to compute the next coefficient element update for that element chain. These estimates can be based on more complex means than simple equal weighted averaging and/or first order filtering of the available data, and can be specifically optimized to cover the period between the next update, and the following update.

Correction of Beacon Errors Induced by Quantization of Beacon Beam Coefficients One of the significant errors in the beacon pointing is the change in the beacon beam 450A-450D shapes due to the uplink of finite word length beamweights (hereinafter also referred to as beamweight coefficients) in place of the desired (continuous or unquantized) values. This error will become an even larger fraction of the total error if the element gain/phase errors are reduced, either by simply improving the elements of the current method, by calibrating the errors, or by implementing other error-reducing techniques described herein.

While quantization errors effect all the communication beams, not just those used to form the pointing beacon, errors in the beacon beams are especially pernicious. While quantization errors in the weights of a particular communication beam affect the pointing of that beam alone, quantization errors in the pointing beacon beams result in an erroneous correction by the satellite attitude control system which will follow that error and drag the several hundreds of payload beams with it, affecting the pointing of all the beams.

Fortunately, the effect of the quantization errors on the beam shape are predictable . . . that is, given the quantized beamweight coefficients and the calibrated element chain (e.g. 402A-408A) gains and phases, antenna analysis software used for the payload 312 design can generate the gain contours of the payload and/or beacon beams 450A-450D formed by the quantized beamweight coefficients.

Over the period between the upcoming beacon beam coefficient update and the next, the satellite control system will try to keep the satellite 100 and/or payload 312 pointed so that the beacon error matches the designed pointing, which is in turn a function of the satellite ephemeris. In particular, it will steer the spacecraft 100 and/or payload 312 to follow a deterministic profile in the measured azimuth and elevation of the angle from the spacecraft beacon boresight to the beacon station 422.

Ground systems have the information required to predict this deterministic profile, and, using the beacon beam 450A–450D shapes produced, for example, by antenna analysis software for the quantized beacon beam coefficients, these ground systems can compute the pointing error that will be produced over this period due to the coefficient quantization. Armed with this knowledge, when the updated beacon beam coefficients are uploaded to the satellite, the ground systems can also upload correction parameters to the onboard SCP 202 to correct the measured beacon beam values 502 or to correct the azimuth and elevation angle to the beacon computed by the spacecraft control processor 202 from the measured beacon beam values 502, thereby producing a desirable change in the satellite pointing. This can minimize the satellite pointing error over that interval in a root-mean-square, minimax, or other sense. These uploaded correction parameters can include beacon null correction values 504 in azimuth and elevation, beacon error gain slope, beacon error gain slope curvature, or beacon boresight vector or generic (roll/pitch/yaw) pointing offsets.

Figure 6A:
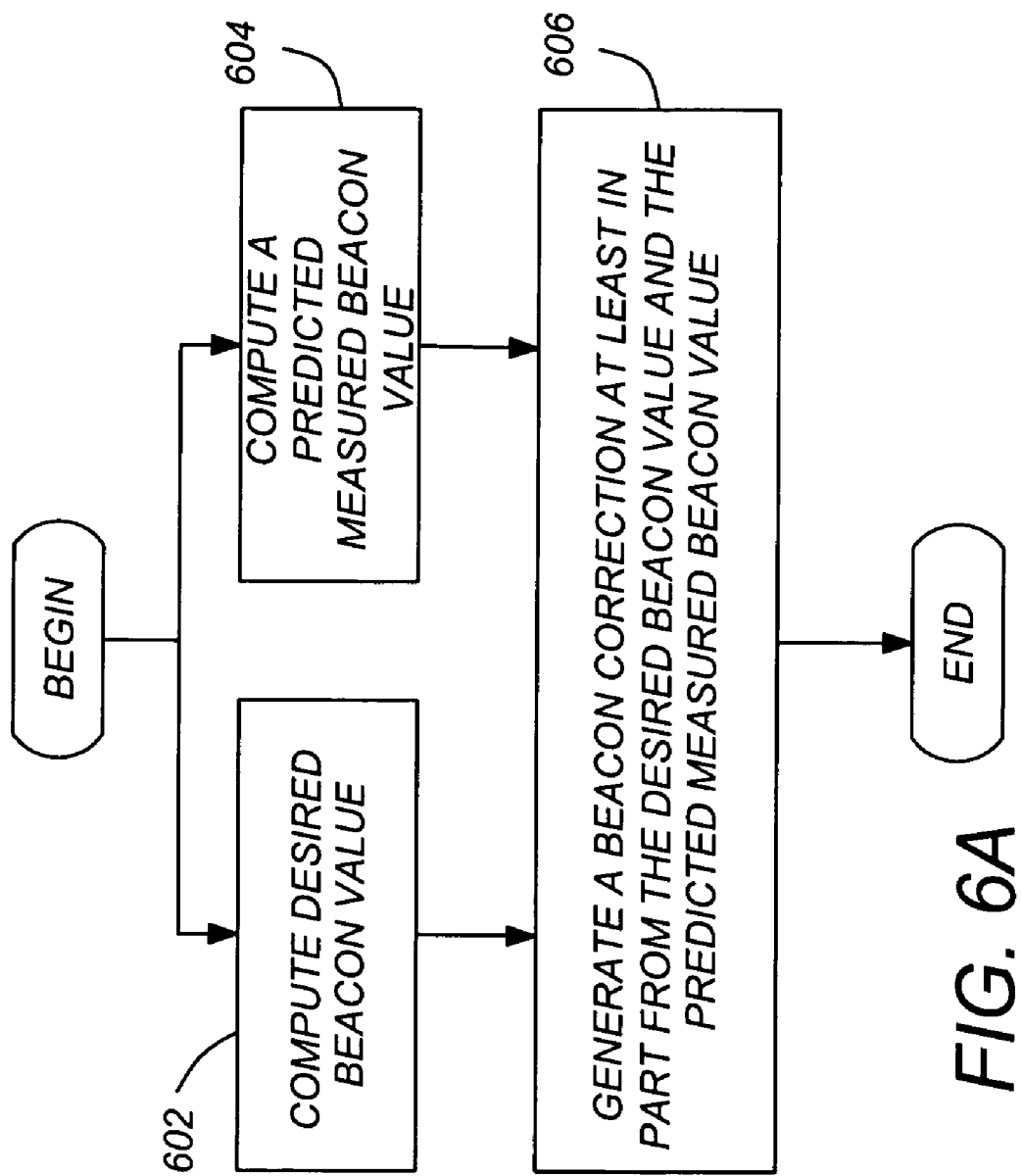
FIG. 6A is a flow chart illustrating one embodiment of process steps in which beacon errors induced by quantization of beacon beam coefficients may be corrected.

FIG. 6A is a flow chart illustrating one embodiment of process steps in which beacon errors induced by quantization of beacon beam coefficients may be corrected. In this embodiment, an antenna pattern calculator 544 is used to determine predicted beacon values using quantized beamweights and desired (continuous) beamweights determined from satellite orbital parameters. The beacon correction values 504 are determined as a function of the difference between the predicted beacon values 546 from quantized and idealized sources.

Figure 6B:
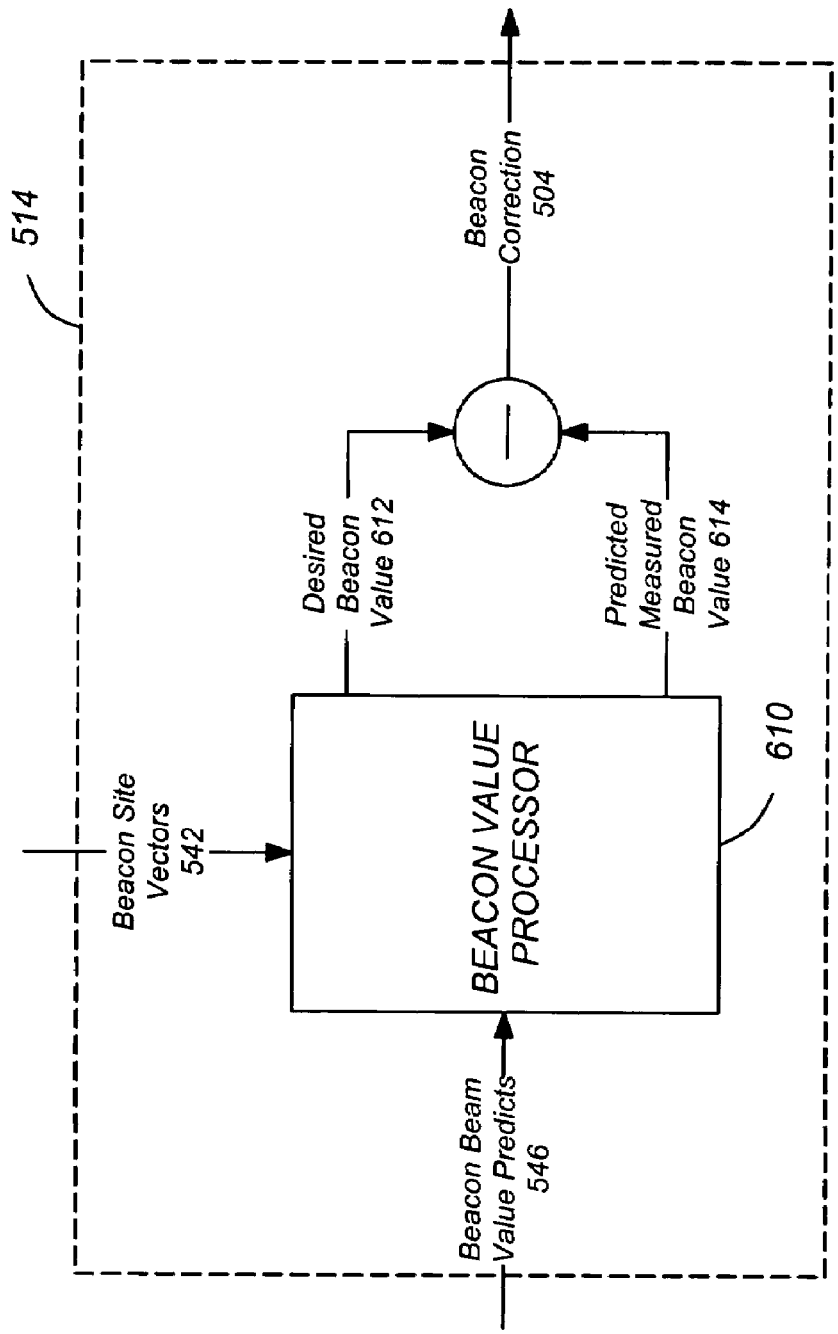
FIG. 6B is a diagram showing one embodiment of a beacon correction value generator 514, which can be used to implement the operations described in FIG. 6A.

FIG. 6B is a diagram showing one embodiment of a beacon correction value generator 514, which can be used to implement the operations described in FIG. 6A.

A desired beacon value 612 is computed, as shown in block 602. In one embodiment, the desired beacon value 612 is determined from the beacon site vectors 542 in the beacon sensor 306 coordinate frame. The beacon site vectors 542 are unit vectors from the satellite 100 to the location of the beacons station 422, resolved in the beacon sensor 306 coordinate frame. The beacon site vectors 542 are determined from the satellite 100 orbit, the desired beacon antenna attitude (the desired orientation or transformation matrix of the antenna reflector 106 relative to the Earth-centered, Earth-fixed reference frame, ECEF) the desired beacon sensor 306 coordinate frame relative to the beacon antenna (orientation of the beacon sensor frame relative to the antenna reflector 106 frame), and the location of the terrestrial beacons 422. The beacon site vectors 542 are used to compute the desired beacon azimuth and elevation angles. Given this information, the desired or "idealized" beacon values are those values which, if the satellite 100 is in the desired attitude for that orbit, the beacon error calculated by the SCP 202 matches the designed pointing.

A predicted measured beacon value 614 is computed, as shown in block 604. The beacon beam value predictions or "predicts" 546 for the quantized beacon beamweights 506 (using the desired beacon site unit vectors 542 in the beacon sensor coordinate frame predicted from the satellite ephemeris 526) are computed by the antenna beam pattern calculator 544 and sent to the beacon correction value generator 514. Finally, a beacon beam correction 504 is generated at least in part from the desired beacon value and the predicted measured beacon value, as shown in block 606. In the embodiment shown in FIG. 6B, the beacon correction value is the difference between the desired measured beacon value 612 and the predicted measured beacon value 614. Note that in this technique, the beacon correction values 504 are determined as a function of the difference between the predicted measured beacon values 614 produced by the quantized beacon beamweights 506 and their related desired measured beacon values 612. The difference between the predicted and desired measured beacon values are sent as correction values 504 to be updated in the SCP 202 or the DSP 412 simultaneously with the update of the beacon beam weights 506 in the DSP 412.

In one embodiment, the beacon value processor 610 of the correction value generator 514 uses a functional copy of the onboard beacon value processing software used in the SCP 202 and/or the DSP 412 to perform analogous functions.

Recalling that the correction values 504 are periodically updated to the satellite 100, the foregoing computations can be performed immediately prior to each update cycle, or to reduce errors due to data staleness, the desired beacon value and the predicted measured beacon value can be determined for a center of a time period for which the beacon beam correction is to be used. Accuracy can also be increased by decreasing the time period for which the corrected coefficients are used, and computing the coefficients more frequently. Also, to further increase accuracy, the foregoing can be implemented using more predicted beacon site unit vectors 542 and coefficients computed, for example, for the start and the end of the next coefficient usage period, the result weighted as appropriate, and used to determine an optimal coefficient value. It is also envisioned that coefficients for multiple times during any time period can be determined, and the actual coefficients can be determined by a curve fit or estimation of the coefficient values at any particular time between the determined values.

Figure 7:
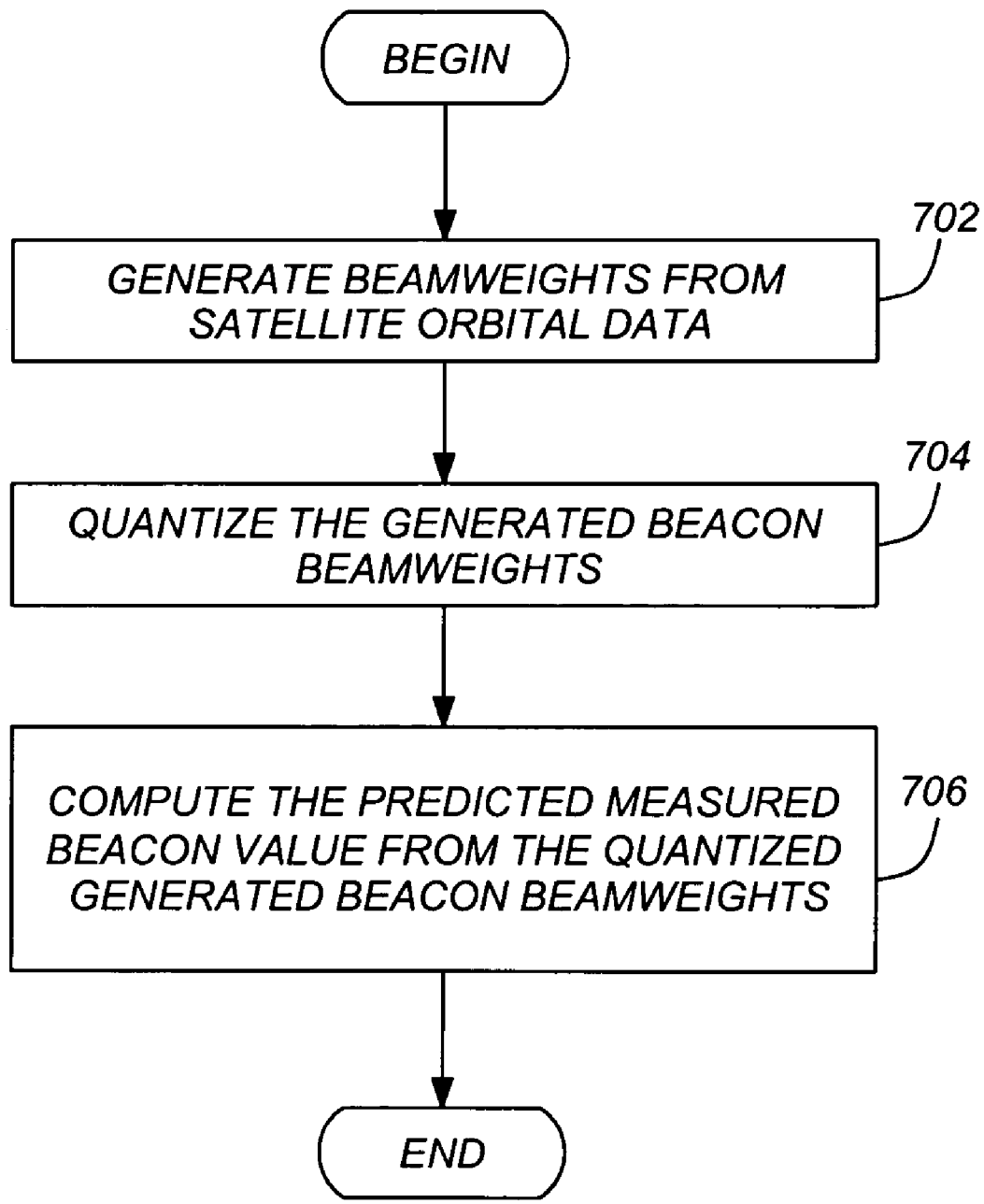
FIG. 7 is a diagram illustrating exemplary process steps that can be used to compute a predicted measured beam value.

FIG. 7 is a diagram illustrating process steps that can be used to compute the predicted measured beacon value. Block 702 shows generating beamweights from the satellite orbital data (e.g. satellite ephemeris data from module 526 or the satellite latitude and longitude 524). This can be accomplished via beamweight generator 522. In one embodiment, the beamweight generator 522 comprises a beamweight lookup table 523 and beamweights are generated by selecting the beamweights from a beamweight lookup table.

Block 704 shows quantizing the generated beacon beamweights. This can be accomplished, for example, by using the beamweight quantizer 520.

Block 706 shows computing the predicted measured beacon value from the quantized generated beacon beamweights. In one embodiment, the predicted measured beacon values are computed from the quantized generated beacon beamweights 506 by use of the antenna pattern calculator 544. For example, the antenna pattern calculator 544 may use the beacon site vectors 542 to compute an RF response of each element chain (e.g. 402A–410A) and together with the quantized beacon beamweights 506, determine a predicted beacon beam value 546. The antenna pattern calculator 544 can do this because the beacon beamweights 506 and the antenna parameters (such as beam wavelength, antenna diameter, antenna focal length, element gain and phase offsets, etc.) are sufficient to determine the antenna gain pattern for each beacon beam 450A-450D. The beacon site vectors 542 determine the points in the beacon beam that are measured if the satellite 100 is at its intended attitude and location. Evaluating the antenna beam pattern at these measurement points yields the predicted beacon values 546, or beacon value predicts. In one embodiment, the generation of the predicted measured beacon value 546 from the beamweights is performed using substantially identical instructions as those used to generate the measured values in the DSP 412.

The foregoing may be practiced in two distinct embodiments. In the first embodiment, the beacon values described above are beacon beam values (e.g. the magnitude of each of the beacon beams 450 used to determine the beacon angle). In this embodiment, beacon beam corrections are transmitted to the DSP 412 and SCP 202, and used to minimize beacon errors. In a second embodiment, the beacon values described above are beacon angle values (e.g. the determined azimuth and/or elevation of the beacon). In this embodiment, beacon angle corrections are transmitted to the SCP 202 (which computes the beacon angles) via the DSP 412 and used to minimize beacon errors.

Figure 8A:
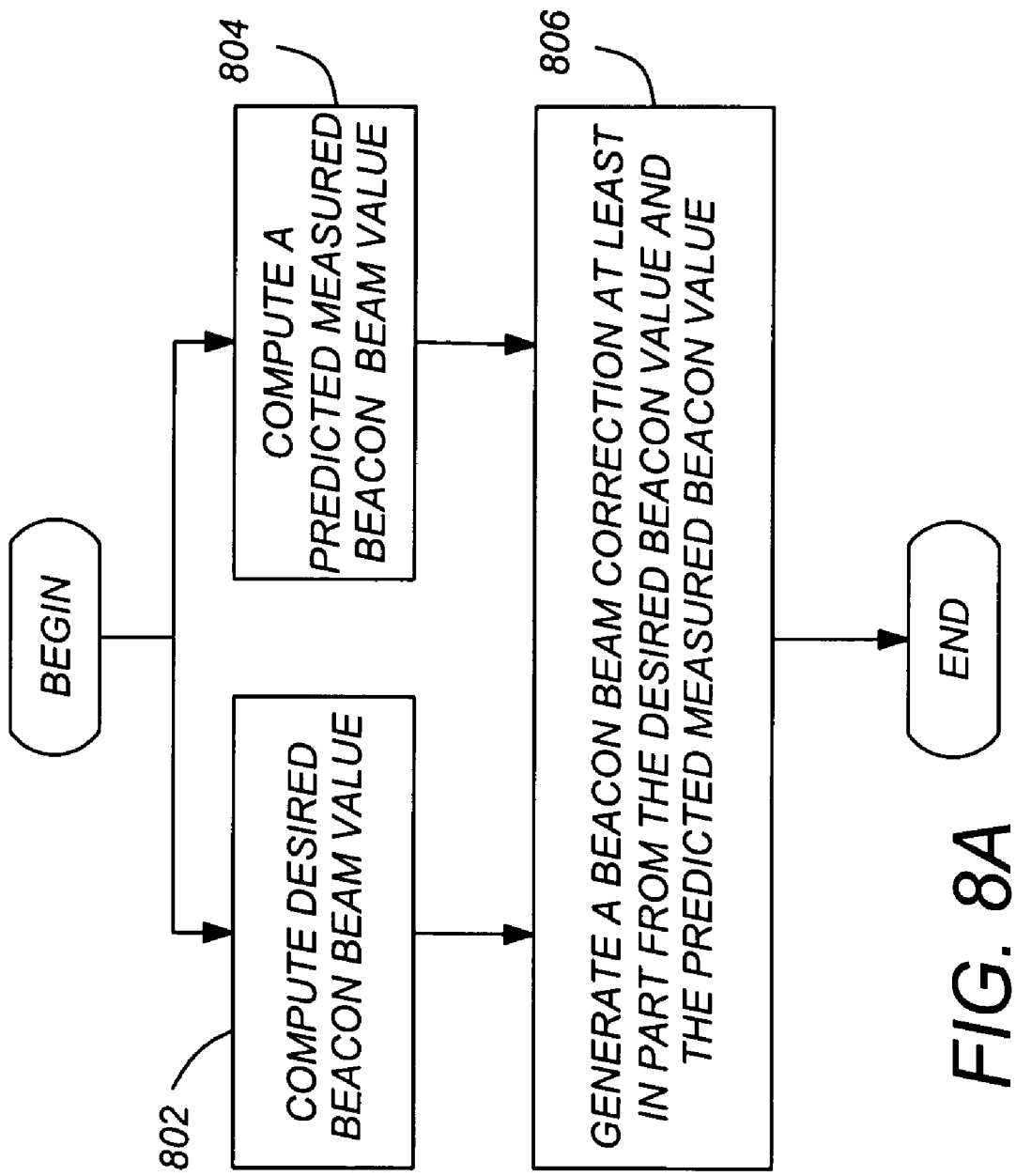
FIG. 8A is a diagram of the embodiment illustrated in FIG. 6A in which the beacon values comprise beacon beam values.

FIG. 8A is a diagram presenting an illustration of the first embodiment. In block 802, a desired beacon beam value is computed. This can be accomplished as described above with respect to FIGS. 6A and 6B. In block 804, a predicted measured beacon beam value is computed. These beacon beam values are used to generate a beacon beam correction, as shown in block 806.

Figure 8B:
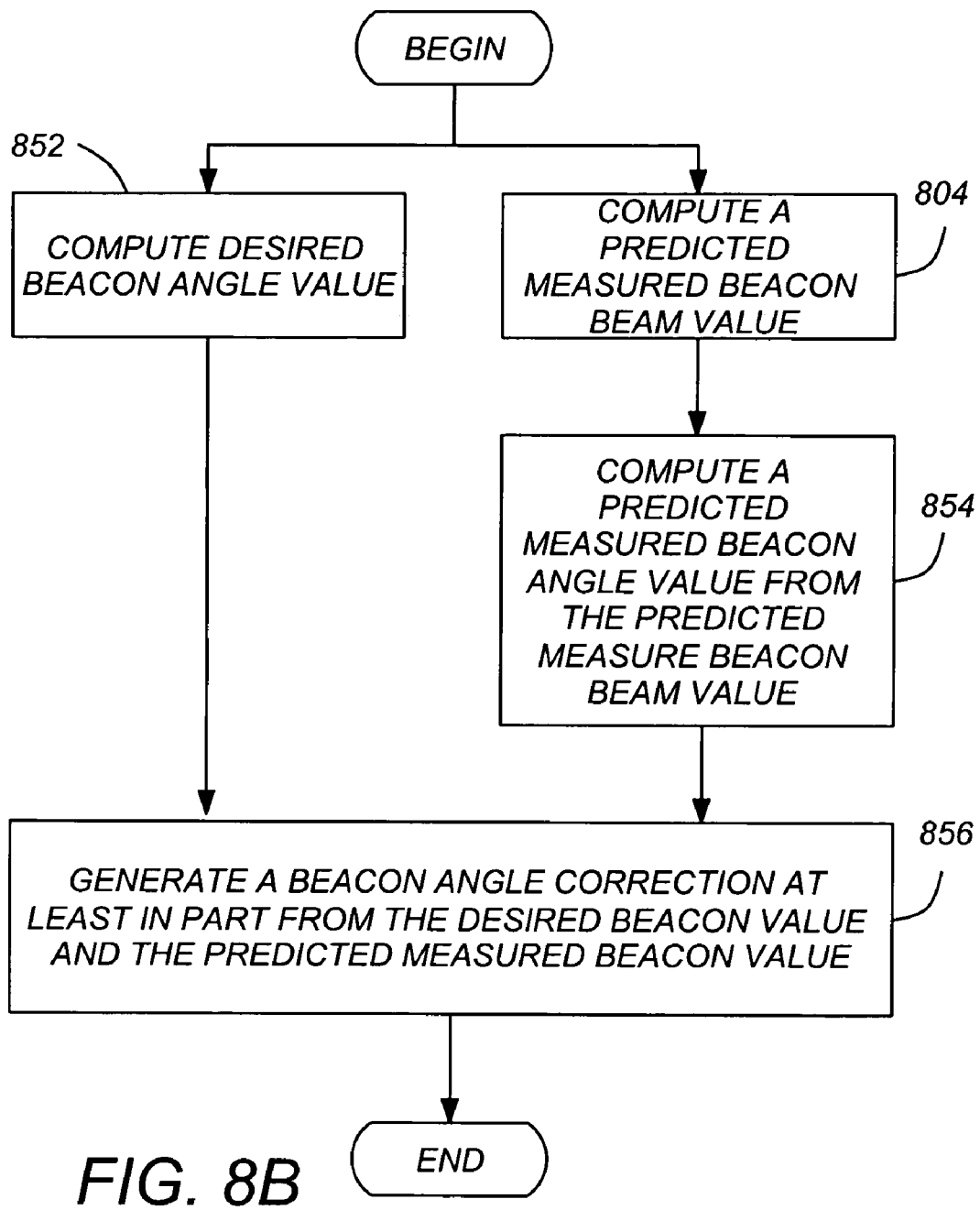
FIG. 8B is a diagram of the embodiment illustrated in FIG. 6A in which the beacon values comprise beacon angle values.

FIG. 8B is a diagram presenting an illustration of the second embodiment. In block 852, a desired beacon angle value is computed. This can be accomplished as described above with respect to FIGS. 6A and 6B (e.g. the computation of the desired beacon azimuth and elevation angles). A predicted measured beacon beam value is computed, as shown in block 804. In this embodiment these predicted measured beacon beam values are used to compute a predicted measured beacon angle value, as shown in block 854. This can be accomplished using the same beacon site vectors 542 and a functional copy of the onboard beacon value processing software (e.g. in the SCP 202) to calculate the desired measured beacon azimuth and elevation angles for those beacon site vectors 542. The computed desired beacon angle value and the computed predicted measured beacon angle value are then used to generate a beacon angle correction, as shown in block 856. In one embodiment, the correction values are the difference between the predicted and desired measured beacon azimuth and elevation angles, and are sent as correction values 504 to be updated in the SCP 202 simultaneously with the update of the beacon beamweights 506 in the DSP 412.

Correction of Beacon Errors by Adjusting
On-Board Processing of the Beacon Error to
Correct for Errors Induced by Beacon Beam
Coefficient Quantization In another embodiment of the present invention, the effect of quantization errors is reduced by selecting the quantized coefficients based at least in part on an explicit evaluation of the effects of quantization on beam quality. In this embodiment, the concept is to evaluate the effect of quantization with the antenna pattern calculator 544, and make quantization decisions based on this evaluation. This is in contrast to the previous techniques of calculating continuous beam weighting coefficients, then quantizing them simply by rounding each continuous coefficient to its closest allowable quantized value. This approach to mitigating quantization errors can be applied to beacon beams, payload communication beams, or any other phased array beams. It can be used to mitigate the effect of quantization on beam boresight pointing, beam contour shape, or some other beam characteristic of interest.

Figure 9:
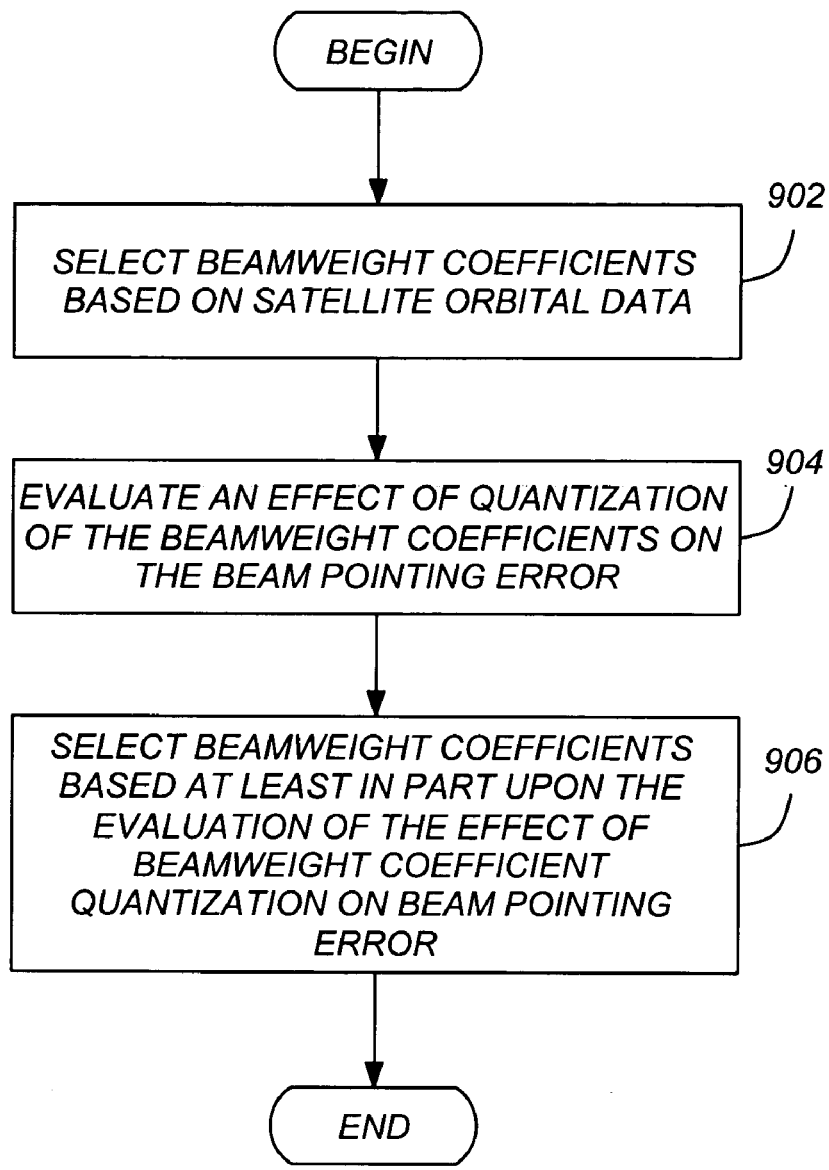
FIG. 9 is a diagram presenting exemplary method steps that can be used to reduce the effect of quantization errors by selecting the quantized coefficients based at least in part on an explicit evaluation of the effects of quantization on one or more beam quality measures.

FIG. 9 is a flow chart presenting exemplary method steps used to practice the above-described embodiment. First, beamweight coefficients are selected based upon satellite orbital data such as the satellite ephemeris 526, as shown in block 902. This can be accomplished, for example, by generating the satellite latitude and longitude 524 from the ephemeris 526 and relating the satellite latitude and longitude 524 with entries in a beamweight coefficient table 523. Next, the effect of quantization of the beamweight coefficients on beam pointing error is evaluated, as shown in block 904. Beamweight coefficients are then selected based at least in part upon the evaluation of the effect of beamweight coefficient quantization on beam pointing error, as shown in block 906.

Figure 10:
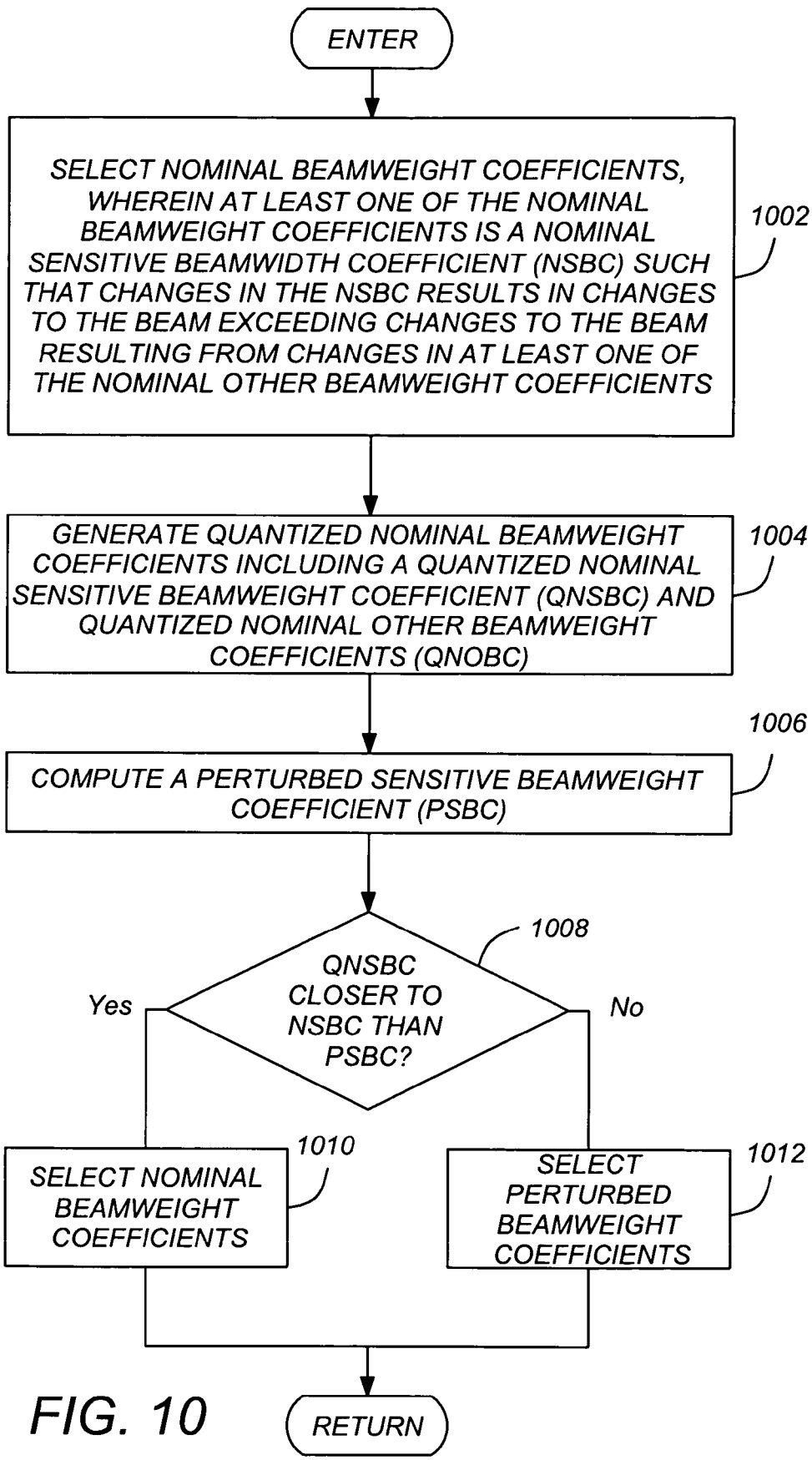
FIG. 10 is a flow chart presenting exemplary method steps that can be used to evaluate the effect of quantization of the beamweight coefficients on the beam pointing errors.

FIG. 10 is a flow chart presenting exemplary method steps that can be used to evaluate the effect of quantization of the beamweight coefficients on the beam pointing errors. In block 1002, nominal beamweight coefficients are selected. The nominal beamweight coefficients include at least one nominal sensitive beamweight coefficient NSBC). The NSBC is a beamweight coefficient in which changes thereto result in larger changes in the resulting beam pointing than at least one of the other nominal beamweight coefficients. In block 1004, quantized nominal beamweight coefficients are generated, including a quantized normal sensitive beamweight coefficient (QNSBC), and quantized nominal other (other than the sensitive) beamweight coefficients. In block 1006, a perturbed sensitive beamweight coefficient (PSBC) is computed.

Figure 11:
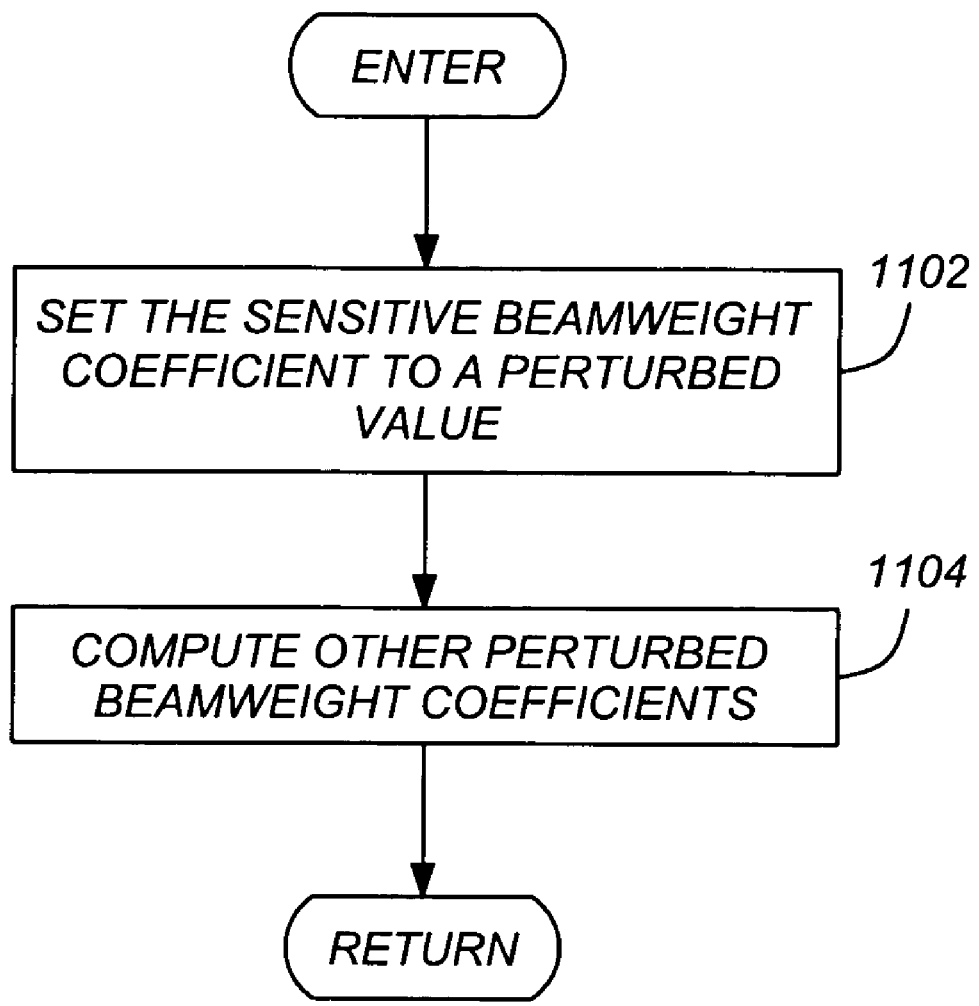
FIG. 11 is a diagram illustrating method steps that can be used to compute the perturbed beamweight coefficient and the other beamweight coefficients.

FIG. 11 is a diagram illustrating method steps that can be used to compute the perturbed sensitive beamweight coefficient and the other beamweight coefficients. The concept is to precompute perturbed ideal solutions to the beamforming problem. The applied constraint for each of perturbed solutions is that the value of the NSBC is not the nominal value, but a slightly offset value. Then, when the actual QNSBC is calculated, we can react to the difference between the QNSBC and the ideal value, by evaluating the precomputed solution with the closest value of the NSBC, to see if this would be a better choice. Note that the exact value of the QNSBC is not known before hand, since it is the result of dividing an ideal beam gain by a measured/estimated element gain. The measured/estimated element gain is continuous and varies with time, and not known exactly beforehand. However, by precomputing alternate solutions, the system can react quickly when the value of the QNSBC is determined. In block 1102, the NSBC is perturbed by plus and minus a fraction of the quantization error . . . for example, ±⅓ of the quantization resolution. In block 1104, using this perturbed value for the sensitive coefficient, the remaining coefficients are computed.

In block 1008, the beam created from the QNSBC and its associated quantized nominal other beamforming coefficients (QNOBC) is compared to an ideal beam pattern created by the continuous NSBC and its associated continuous other beamforming coefficients and to the beam pattern created by quantizing the PSBC and its associated other continuous beamforming coefficients. These beam patterns can be computed by the antenna pattern calculator 544. Nominal beamweight coefficients are selected if the beam pattern calculated using the QNSBC and its associated quantized nominal other beamforming coefficients (ON-OBC) is closer to the beam pattern calculated using the continuous NSBC and its associated continuous other beamforming coefficients, while perturbed beamweight coefficients are selected if the beam pattern calculated using the QNSBC and its associated quantized normal other beamforming coefficients (ONOBC) is closer to the beam pattern computed by quantizing the PSBC and its associated other continuous beamforming coefficients than the beam pattern calculated using the continuous NSBC and its associated continuous other beamforming coefficients. This is shown in blocks 1008-1012.

The method above has the advantage of improving performance with relatively little additional real-time processing. More elaborate approaches are also possible—the branch of applied mathematics called "integer programming" is devoted to methods of finding optimal solutions to problems subject to quantization constraints, and any of the methods of integer programming could be applied here, such as "branch and bound" or "cutting plane".

Figure 12A:
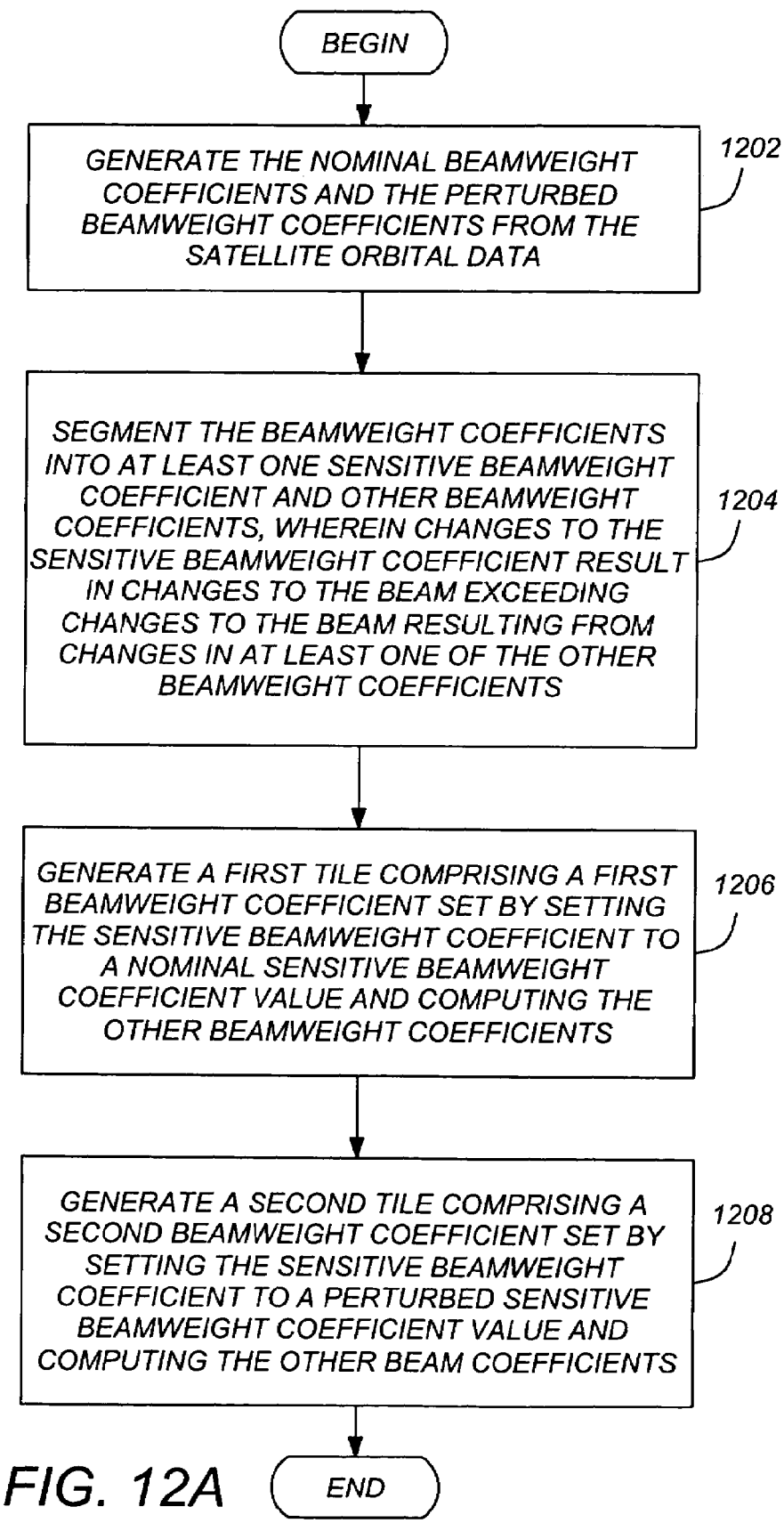
FIGS. 12A and 12B are flow charts showing another embodiment of a method to correct beacon errors by adjusting on-board processing to correct for beacon beam coefficient quantization.
Figure 12B:
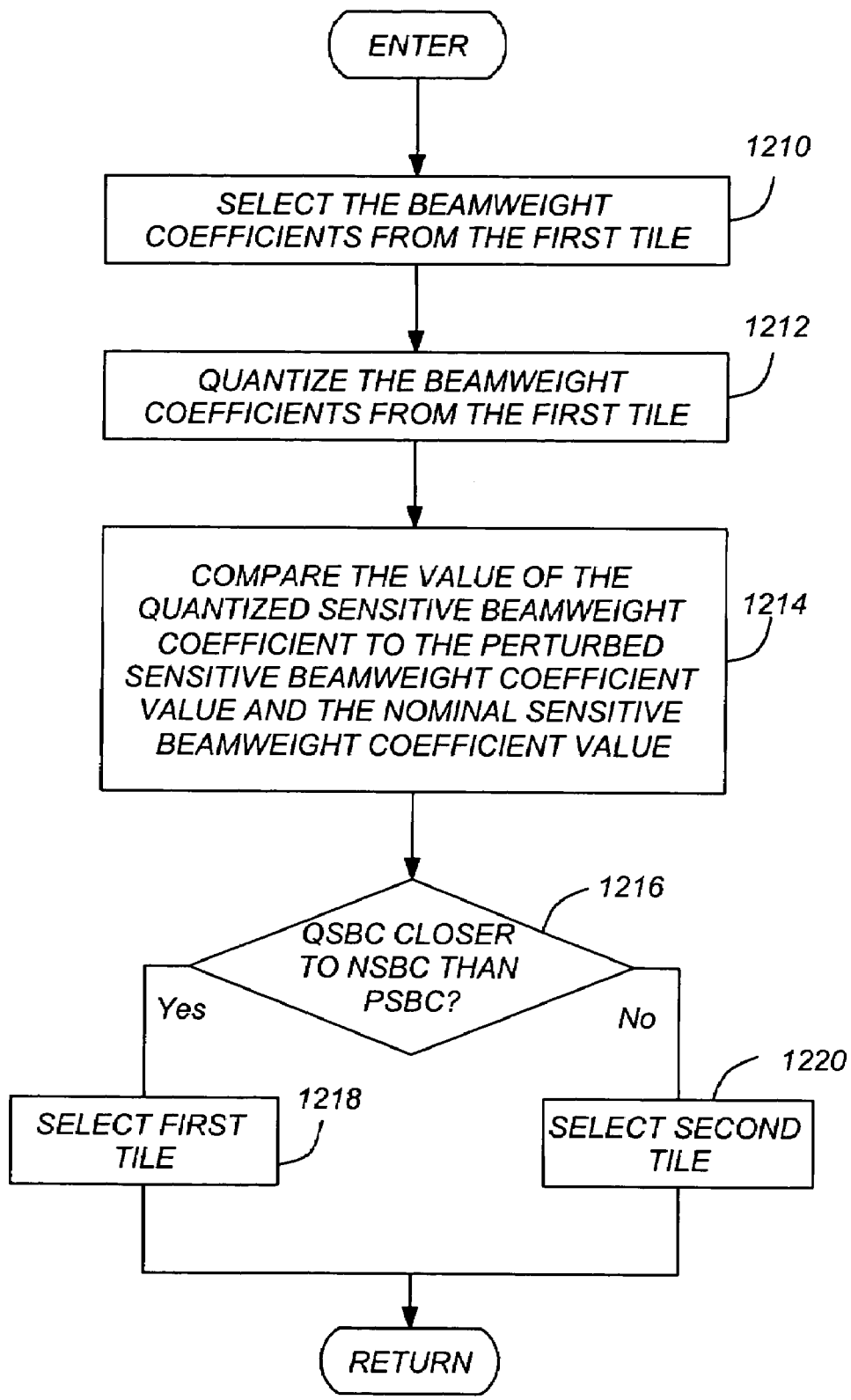

FIGS. 12A and 12B are flow charts illustrating another embodiment of a method to correct beacon errors by adjusting on-board processing to correct for beacon beam coefficient quantization. In the discussion below, the operations shown in FIGS. 12A and 12B will be discussed with further reference to FIGS. 13A and 13B, which illustrate the process of generating and comparing quantized and perturbed coefficients.

Figure 13A:
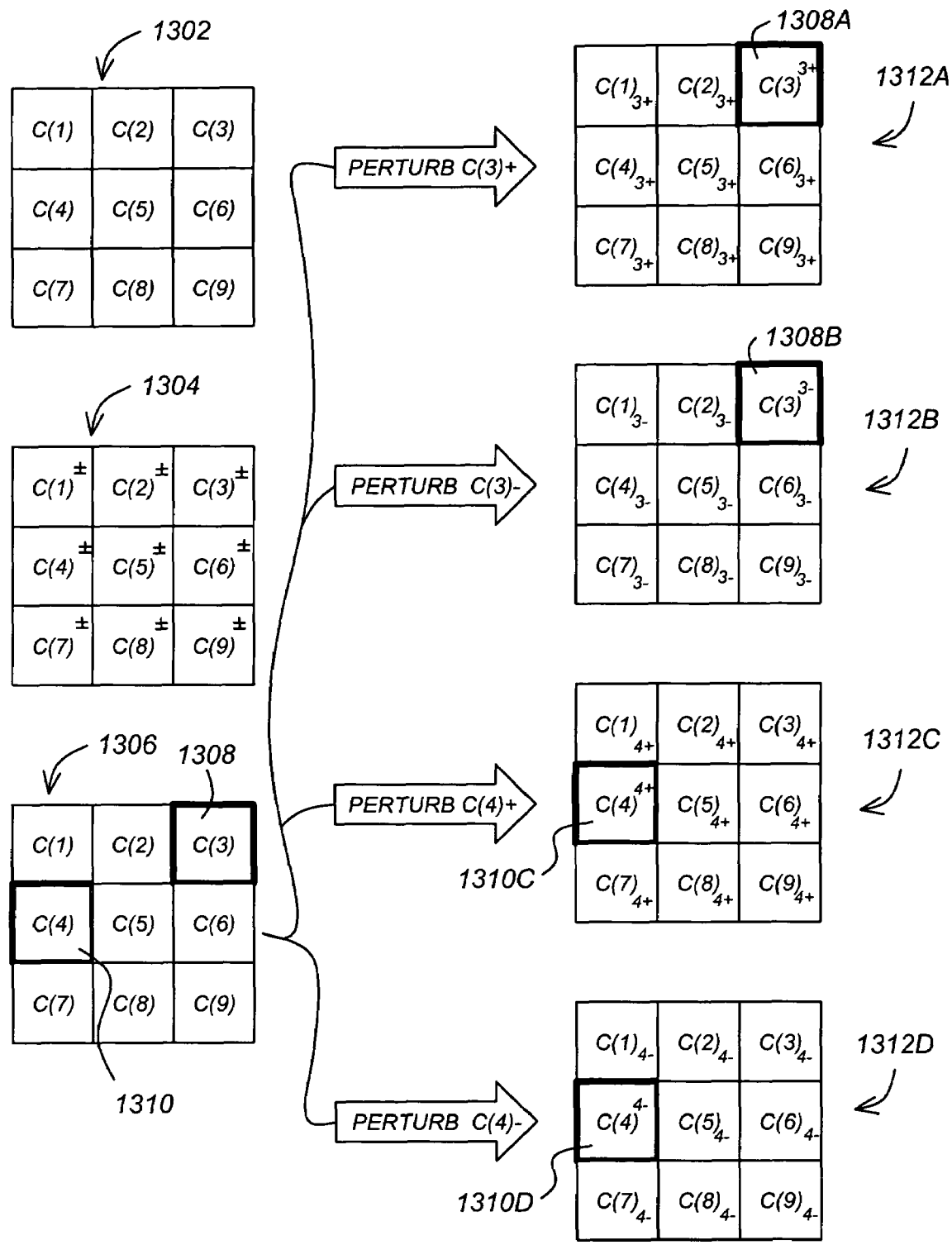
FIGS. 13A and 13B illustrate the process of generating and comparing quantized and perturbed coefficients.
Figure 13B:
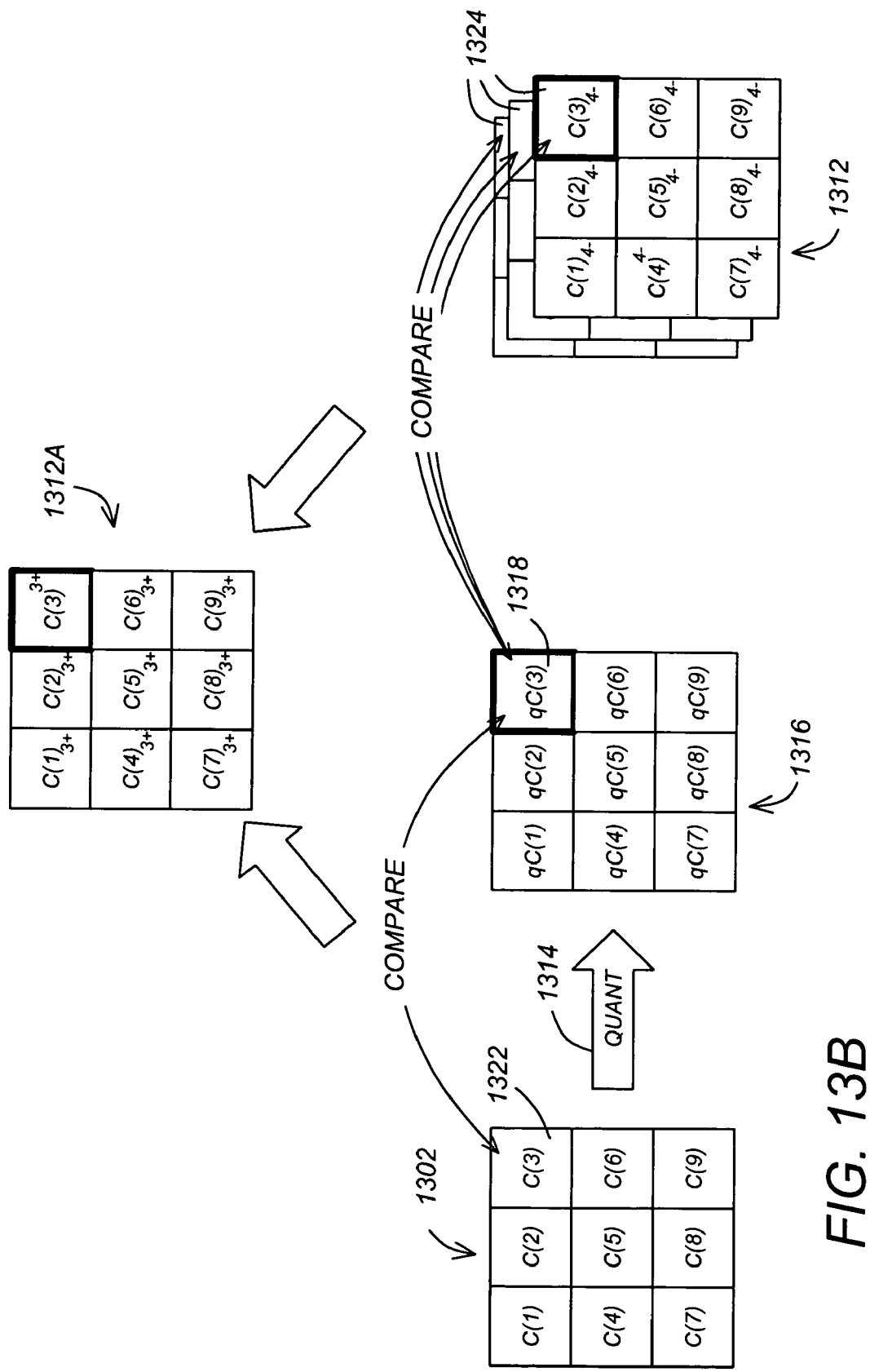

Nominal beamweight coefficients 1302 are generated from the satellite orbital data, as shown in block 1202. A tile 1302 of nominal beamweight coefficients are then analyzed to determine which coefficient is the most sensitive . . . that is, which of the coefficients $C(1)$-$C(9)$ has the greatest influence on the beam. The "tile" refers essentially to a group of beamweight coefficients, which may or may not be two dimensional as illustrated in FIGS. 13A-13B. This is accomplished by perturbing each of the beamweight coefficients $C(1)$-$C(9)$, one at a time, and determining which perturbed coefficient has a greater influence on the beam than the other beam coefficients. Using this technique, one or more "sensitive" beamweight coefficients are identified, hence segmenting the beamweight coefficients into "sensitive" and "other" beamweight coefficients. In the example shown in FIG. 13A, perturbations in beamweight coefficients $C(3)$ 1308 and $C(4)$ 1310 are determined to have a greater impact on the resulting beam than the remaining coefficients $C(1)$, $C(2)$, and $C(5)$-$C(9)$, so they are designated as sensitive beamweight coefficients.

Next, as shown in blocks 1206 and 1208, a series of perturbed tiles 1312A-1312D are generated (hereinafter alternatively referred to as perturbed tiles 1312). Each tile 1312 includes a possibly multi-dimensional beamweight coefficient set or subspace, and is generated by perturbing one of the sensitive coefficients, and computing the remaining coefficients. For example, tile 1312A is generated by perturbing sensitive coefficient $C(3)$ 1308A and computing the value for each of the remaining coefficients $C(1)$-$C(2)$ and $C(4)$-$C(9)$.

Turning now to FIG. 12B, beamweight coefficients from the first tile 1302 (having nominal beamweight coefficients) is quantized 1314 (e.g. by the beamweight quantizer 520), as shown in blocks 1210 and 1212, thus producing a tile of quantized nominal beamweight coefficients. The value of the quantized sensitive beamweight coefficient 1318 is then compared to the corresponding values in each of the tiles 1312, as shown in block 1214. If the quantized sensitive beamweight coefficients 1318 are closer to the nominal sensitive beamweight coefficient 1322 than any of the perturbed sensitive beamweight coefficients 1324, the tile 1302 with the nominal beamweight coefficients is selected, and these coefficients are used. If the one of the tiles 1312 has a perturbed sensitive beamweight coefficient 1324 that is closer to the nominal sensitive beamweight coefficient 1322, then the tile 1312 having that sensitive beamweight coefficient 1324 is selected, and its coefficients are used. This is illustrated in blocks 1214-1220. In the exemplary illustration presented in FIG. 13B, the sensitive beamweight coefficient is $C(3)$, and the value of the positively perturbed third coefficient $C(3)^{3+}$ is closer to the value of the nominal beamweight coefficient $C(3)$ than the quantized nominal beamweight coefficient $qC(3)$, so the coefficients of the tile 1312A are used.

Figure 14:
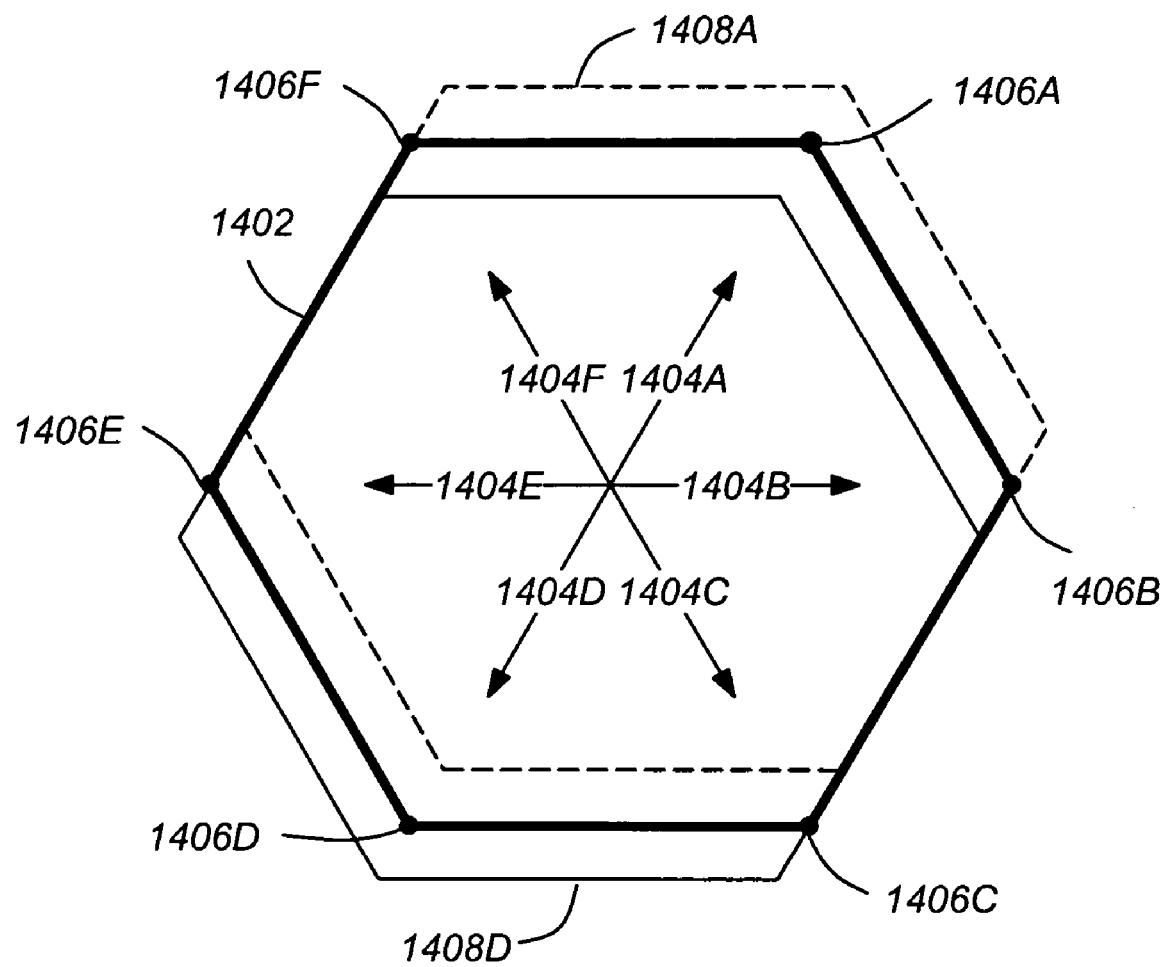
FIGS. 14-16 are diagrams presenting an example of how the effect of quantization errors can be reduced by selecting the quantized coefficients based at least in part on an explicit evaluation of the effect(s) of quantization on beam quality.
Figure 15:
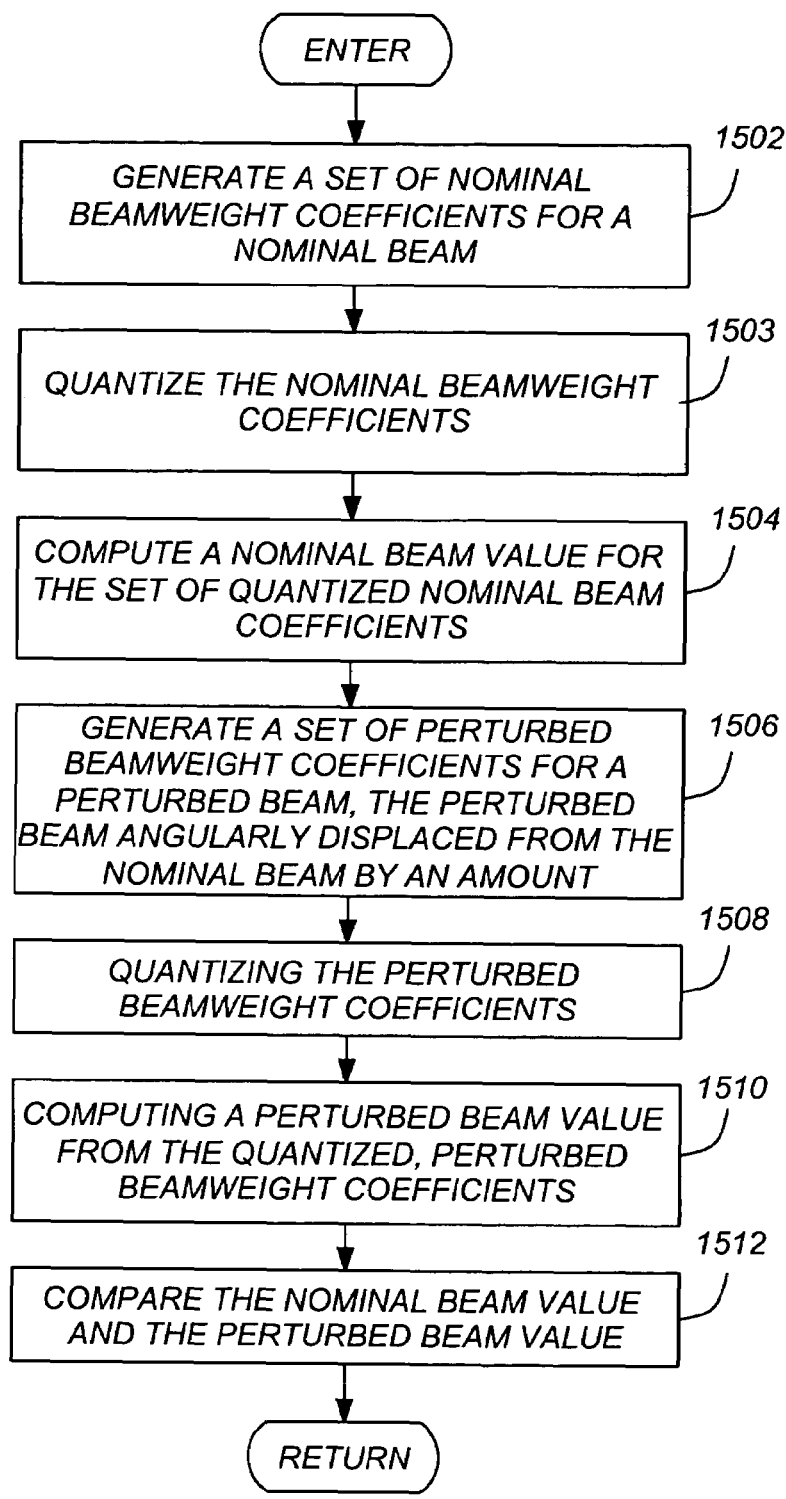
Figure 16:
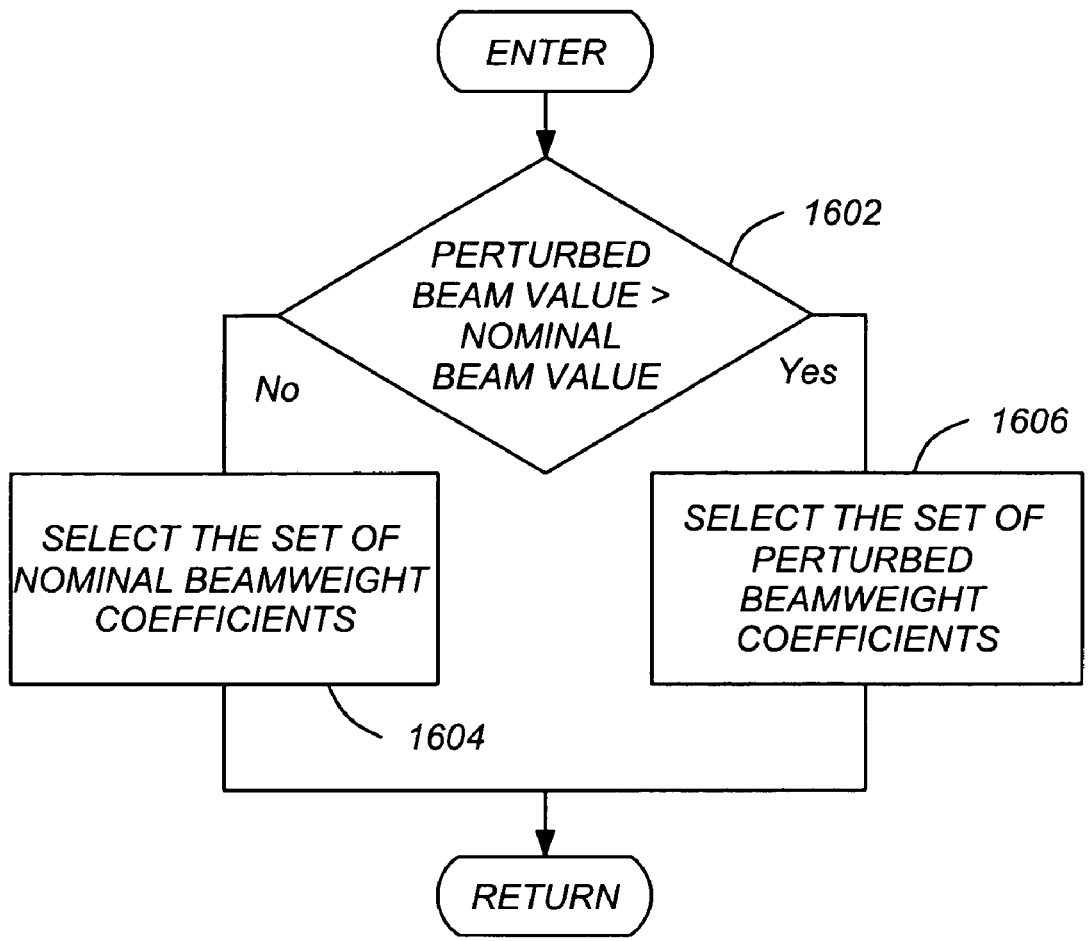

FIGS. 14-16 present another example of how the effect of quantization errors can be reduced by selecting the quantized coefficients based at least in part on an explicit evaluation of the effects of quantization on beam quality.

FIG. 14 is a diagram showing nominal 1402 and perturbed 1408A, 1408D beams. To summarize, in this approach, quantization can be dealt with in the payload (e.g. an antenna, which can be aimed at various terrestrial locations) metric space. For each beam set in the original continuous beamweight table 523, continuous payload beamweights are created for a number N of perturbed beams. In one embodiment, each beam is presumed to cover a hexagonal cell (e.g. N=6) 1402 on the Earth's surface and provide a certain minimum equivalent isotropic radiated power (EIRP) over the hexagon. The minimum EIRP will be at the six vertices 1406A-1406F (hereinafter alternatively referred to as vertices 1406) of the hexagon, and the six perturbations represent shifting the nominal payload beam slightly in the direction of each vertex 1406A-1406F by a value comparable to the effective beam shifts that beamweight quantization will induce. After generating the trial payload beam weights 508 based on the nominal continuous beamweights 523 as described above, these trial beamweights are passed back to continuous beamweight table 523 again, also as described above. The trial beamweights 508 are then passed to the antenna pattern calculator 544 together with unit vectors to the six vertices (1404A-1404F) as test directions 548. The antenna pattern calculator 544 then calculates the beam value predictions 546 (in this example, in the form of predicted EIRP of the beam at the vertices 1404A-1404F) and sends them back to the continuous beamweight table 523. The continuous beamweight table 523 keeps track of how well each beam scores, and completes the first pass through all of the N perturbed beams before looking for a beam which has an improved EIRP compared to the nominal beam. If one of the N perturbed beams has an improved EIRP, the associated coefficients are selected for use. In one embodiment, the perturbed beam selected for use is the perturbed beam having the highest EIRP.

In using the foregoing technique, an "improved" EIRP can be defined as a beam having the highest average EIRP at all of the vertices 1406, or the beam that has the highest minimum EIRP at each of the vertices 1406.

An iterative technique can be employed wherein, preferably beginning with the vertex 1406 that need improvement most, the continuous beamweight table 523 passes the perturbed continuous payload beamweights 523 for the adjacent beam whose remaining vertices have the highest EIRP to the quantizer 520. The beamweights 508 are again evaluated by the antenna pattern calculator 540. If they are an improvement, table 523 proceeds to the vertex having the lowest EIRP. If they aren't an improvement, the two neighboring beams can be examined to see if this vertex can be better served by one of the neighboring beams before settling for the original coefficients and proceeding to the next vertex in need of improvement. The process can continue until it is time to upload the coefficients, or all trials have been exhausted. This approach makes use of the concept that, while the original beam pattern was based on idealized region shapes, in practice it may be sufficient that all points in the coverage region have sufficiently high EIRP. If quantization effects make it difficult for a given beam to cover all of its nominally assigned area, perhaps a neighboring beam can be slightly expanded to pick up the slack. In systems where users are assigned to the beam they sense most strongly, this slight shift in the assigned area should be relatively transparent to the rest of the system. This approach also is robust to the uncertain and perhaps variable availability of computation resources by starting with a feasible solution, and then incrementally trying to improve it by working the areas in priority order.

FIG. 15 is a diagram presenting another embodiment of how the effect of the quantization of the payload coefficients 508 on beam pointing error can be evaluated, as shown in block 904 of FIG. 9.

A set of nominal beamweight coefficients 506 for a nominal (unperturbed and unquantized) beam are generated, as shown in block 1502. The nominal beamweight coefficients are then quantized, as shown in block 1503. A nominal beam value 546 is then determined for the set of quantized nominal beam coefficients 506, as shown in block 1504. The nominal beam value 546 can be computed in many ways, including the average EIRP of the nominal beam at each of its vertices, or the minimum EIRP of the nominal beam, considering all of its vertices.

A perturbed beam is then defined. In one embodiment, the perturbed beam is angularly displaced toward one of the vertices, such as perturbed beam 1408A shown in FIG. 14, which is perturbed in the direction of vector 1404A. The beamweight coefficients are determined for the perturbed beam 1408A, using, for example, the continuous beamweight table 523 or an equivalent source such as an algorithm.

A set of perturbed beamweight coefficients 528 for a perturbed beam 1408A are generated, as shown in block 1506. Thereafter, the beamweight coefficients are quantized, as shown in block 1508. In one embodiment, this is accomplished by providing the beamweight coefficients to the beamweight quantizer 520. Next, a perturbed beam value is determined from the quantized and perturbed beamweight coefficients, as shown in block 1510. In one embodiment, the perturbed beam value is determined at each of the vertices 1406A-1406F of the nominal beam 1402. This can be accomplished, for example, by the antenna pattern calculator 544. Next, the nominal beam value is compared to the perturbed beam value, as shown in block 1512. Returning to FIG. 9, beamweight coefficients are selected based at least in part on the evaluation of the effect of beamweight coefficient quantization on beam error.

FIG. 16 is a flow chart illustrating one possible technique of selecting beamweight coefficients based at least in part upon the evaluation of the effect of beamweight coefficient quantization in beam error. In block 1602, the perturbed beam value is compared to the nominal beam value. If the perturbed beam value is greater than the nominal beam value, the perturbed beamweight coefficients are selected. If not, the nominal beamweight coefficients are selected. This is shown in blocks 1602-1606.

Of course, the foregoing operations need not be limited to examination of a single perturbed beam. The foregoing operations can be repeated for additional vertices (e.g. using perturbed beam 1408D, which was perturbed in the direction of vector 1404D towards vertex 1406D). In this case, the beam value for each of the perturbed beams is evaluated and compared to the nominal beam value, and among these values, the one with the greatest value is selected for the beamweight coefficients. For example, if the nominal beam value is greater than all of the perturbed beam values, the nominal beamweight coefficients are selected, and if the beam value of the beam perturbed in the direction of vector 1404D is greater than the value of the nominal beam and all of the other perturbed beams, the coefficients used to generate perturbed beam 1408D are selected.

The foregoing refers to a generally defined peripheral edge of the nominal beam as having "vertices" and computations are performed to determine the perturbed beam whose quantized coefficients result in the best performance at those vertices. However, although it is convenient to implement the present invention by assuming the beam shapes are hexagonal and the vertices are those disposed at each corner of the hexagon, the shape of the beam need not be a hexagon, nor need the vertices of the beam shape be symmetrically arranged about the periphery of the beam. Instead, the vertices can refer to any portion of the beam at its periphery.

Figure 17A:
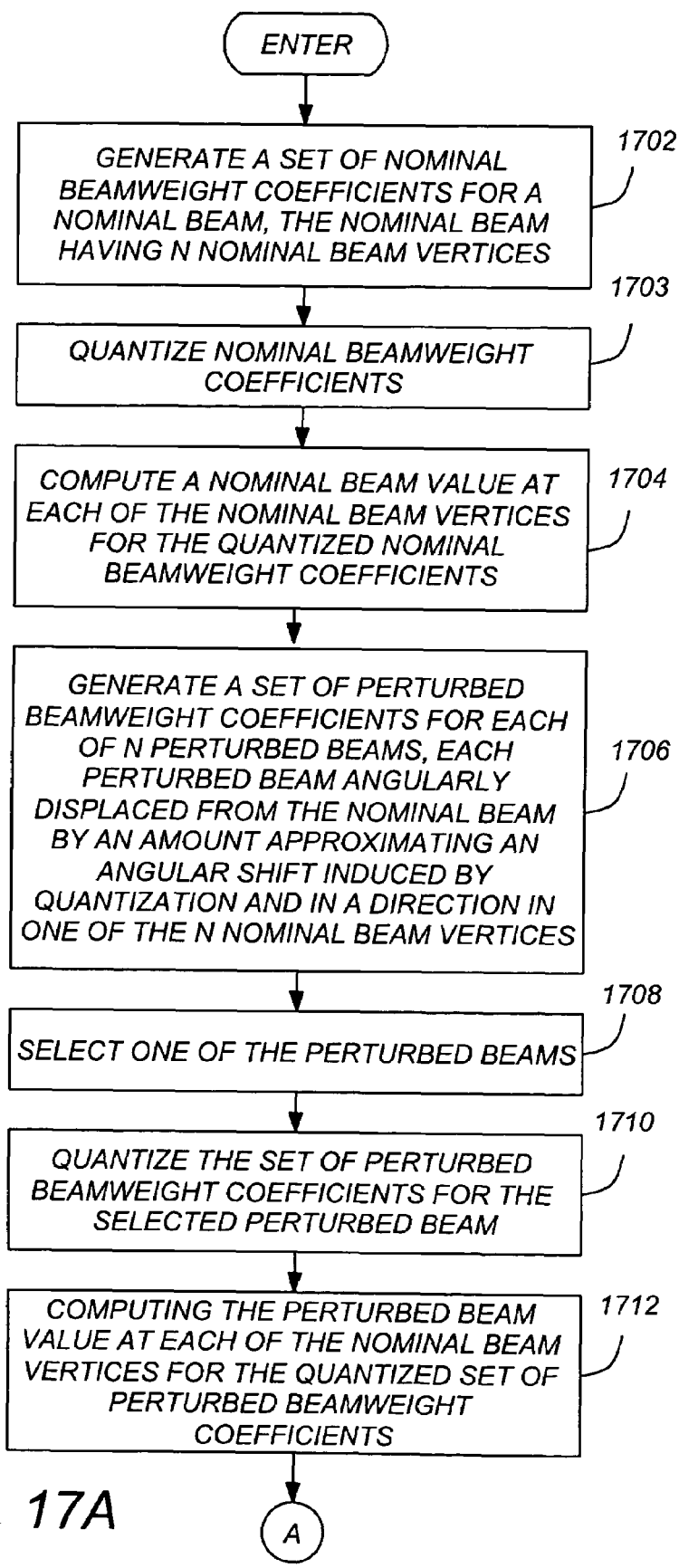
FIGS. 17A and 17B present a flow chart of another embodiment of the method described in connection with FIGS. 14-16.
Figure 17B:
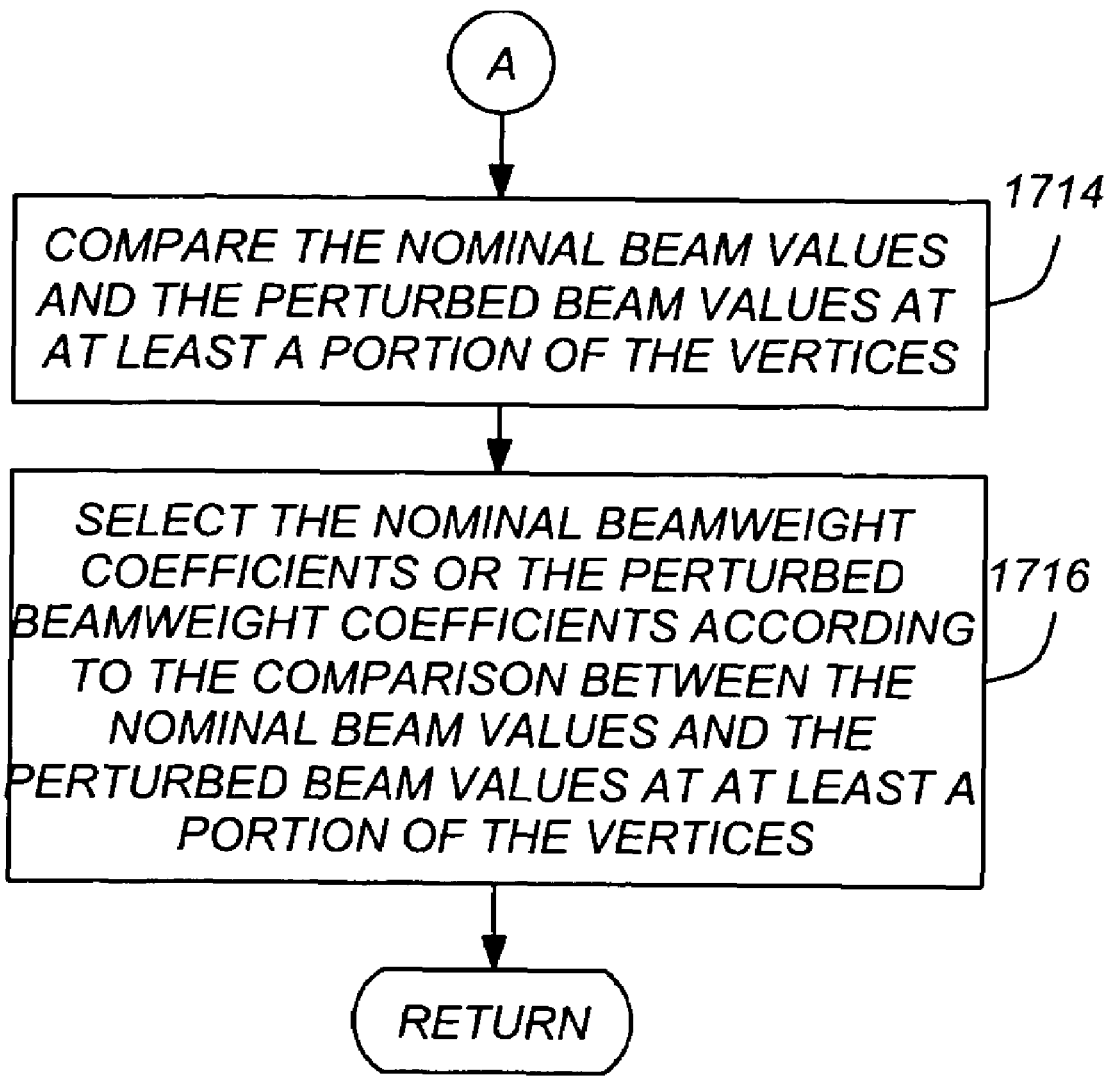

FIGS. 17A and 17B present a flow chart of another embodiment of the above-described method. A set of nominal beamweight coefficients are generated for a nominal beam 1402 having N vertices. This is shown in block 1702. As described above, the nominal beam shape can be hexagonal, pentagonal, square, or any general shape, and the vertices can include any point on the periphery of the beam shape. The nominal beamweight coefficients are quantized, as shown in block 1703. Using the quantized nominal beam coefficients, a nominal beam value is computed at each of the nominal beam vertices, as shown in block. 1704. A set of perturbed beamweight coefficients are then generated for each of N perturbed beams (e.g. beam 11408), as shown in block 1706. In one embodiment, the perturbed beams are angularly displaced from the nominal beam 1402 by an amount approximating an angular shift induced by quantization and in a direction of one of the N nominal beam vertices. A perturbed beam is selected and the beamweight coefficients associated with this perturbed beam (perturbed beamweight coefficients) are quantized, as shown in blocks 1708-1710. Using the quantized perturbed beamweight coefficients, a value of the perturbed beam is computed at each of the vertices, as shown in block 1712. The operations shown in blocks 1708-1712 can be repeated for as many perturbed beams as desired. Typically, a perturbed beam is generated for each vertex of the beam.

As shown in block 1714, the nominal beam values and the perturbed beam values are compared at least a portion of the vertices. Depending upon the outcome of this comparison, block 1716 selects either the nominal beamweight coefficients or the perturbed beamweight coefficients. Typically, from among the set of beams including the nominal beam and all of the perturbed beams, the beamweight coefficients that are selected are those associated with the beam having the highest beam value. To guarantee that a minimum level of signal be provided to the entire cell, the "highest beam value" may be the beam having highest minimum EIRP at its vertices. For example, if the value of the first perturbed beam at the six vertices of the nominal beam is (5, 5.5, 6, 6.5, 4.7, 5) and value of a second perturbed beam at the six vertices of the nominal beam are (7, 6.5, 7, 7.5, 4.6, 7), the coefficients of the first perturbed beam may be used, because the lowest EIRP (4.7) at any vertex is higher than the lowest EIRP (4.6) at any vertex of the second perturbed beam, even if the average EIRP among the vertices of the second perturbed beam is higher than the average EIRP among the vertices of the first perturbed beam.

Correction of Beacon Errors by Using an Element Gain/Phase Predictor/Corrector

Beacon and payload beamweight coefficients 506, 508, are periodically updated in the DSP 412 via uplink 510 and telemetry and command processing 512. In another embodiment of the present invention, beam errors can be reduced by predicting channel element (see, e.g. 402A-408N of FIG. 4) gain/phase characteristics at relevant times between such updates. This is made possible because the gains and phases of the relevant channel elements are relatively stable over reasonable update periods (e.g. 15-60 minutes), the movement of the gain and phase of the channel elements are highly correlated to one another, and depend largely on temperature, and because the rates at which the gains and phases of the channel elements change manifest a strong diurnal pattern.

In this embodiment, one of the inputs to the quantizer 520, the element gain and phase adjustments 532, is changed from the calibration logic 528 described above to an element gain/phase prediction module 554 having one or more modules implementing a model that generates predicted element gain/phase adjustments 556 which are explicitly propagated forward in time to an optimal time corresponding to a subsequent beamweight usage period. In other words, the adjustments 556 are propagated to a time which best serves the next set of beamweights 506, 508 that will be used on the spacecraft 100. The module 554 makes use of the sun vector 558 in the coordinate frame of the payload feed array, the time 570 as well as the element traffic levels 536, the sensed temperatures 538 and the sensed currents 540 (which indicate internal heat dissipation). The sun vector 558 is a variable that is a major source of thermal disturbance, and hence a driver of element gain/phase changes. The time 570 is used to drive empirically fitted diurnal, weekly and/or annual modeling terms to reduce the measurement residuals from the explicitly modeled terms. The element traffic levels 536 drive internal heat dissipation, affecting temperature, and thus element gain/phase changes.

In one embodiment, the element gain/phase prediction module 554 is a parameterized model that can be implemented as a direct thermal model consisting of the element chains (e.g. elements 402A, 404A, 406A, 408A, and 410A of the first chain and elements 402B, 404B, 406B, 408B, and 410B of the second chain, and so on) broken into their sequential elements 402-410 and with gain and phase thermal coefficients for each. Heat inputs from sun loading and element heat dissipation can be modeled, together with thermal heat capacities, thermal conductivities, thermal emissivities, radiation coupling factors, and other parameters. From knowledge of how such factors are accounted for in satellite radiation torques and orbit perturbations, it can be ascertained that a direct physical model such at that which is described above will result in systematic (e.g. diurnal) residual terms that motivate the addition of general empirical diurnal corrections, which can be parameterized as a Fourier series, segmented polynomials, linear interpolated table, or other generalized form. Also, a simplified model using a subset of the parameters described above can also be used.

The module 554 produces two sets of element gain/phase predictions. The first set, the propagated gain/phase 510 adjustments, are the prediction of the element gain/phase measurements produced by the calibration logic 528 from preprocessed, filtered, or averaged measured changes to the gain and phase in each element chain or channel. Using known predictor/corrector estimation techniques, these values are compared with the element gain/phase adjustments 564 produced by the calibration logic 528 to form measurement residuals. In the illustrated embodiment, this comparison is formed by differencing the propagated element gain and phase adjustments 510 and the measured element gain and phase adjustments from the calibration logic 528. The element gain and phase adjustments and propagated element gain and phase adjustments can be time-matched for comparison purposes.

The measurement residuals are used by the estimate and model corrector 559 to produce iterative estimate and model updates 561. The prediction module 554 also provides update gains (or Kalman gains) 562 to the estimate and model corrector 559, such as in an approach analogous to that of a Kalman filter. For example, it may be desirable to place greater update gain on the measurements for times of day when the model prediction has proven to be less reliable (e.g., during rapidly changing dissipation levels in the DSP 412), and lower update gain on the measurements for time of day when the measurements are known to have more noise (e.g., when the solar arrays cause multipath reflections into the payload calibration horns). The estimate and model updates 561 include updates to the estimated element chain gains/phases and to any or all of the parameters in the module 554.

The second set of gain/phase predictions 556 from the module 554 are used to project the estimated gains/phases forward to the time period where the beam coefficients 506, 508 currently being calculated will be in used in the satellite 100, essentially a half-step-ahead prediction.

Figure 18:
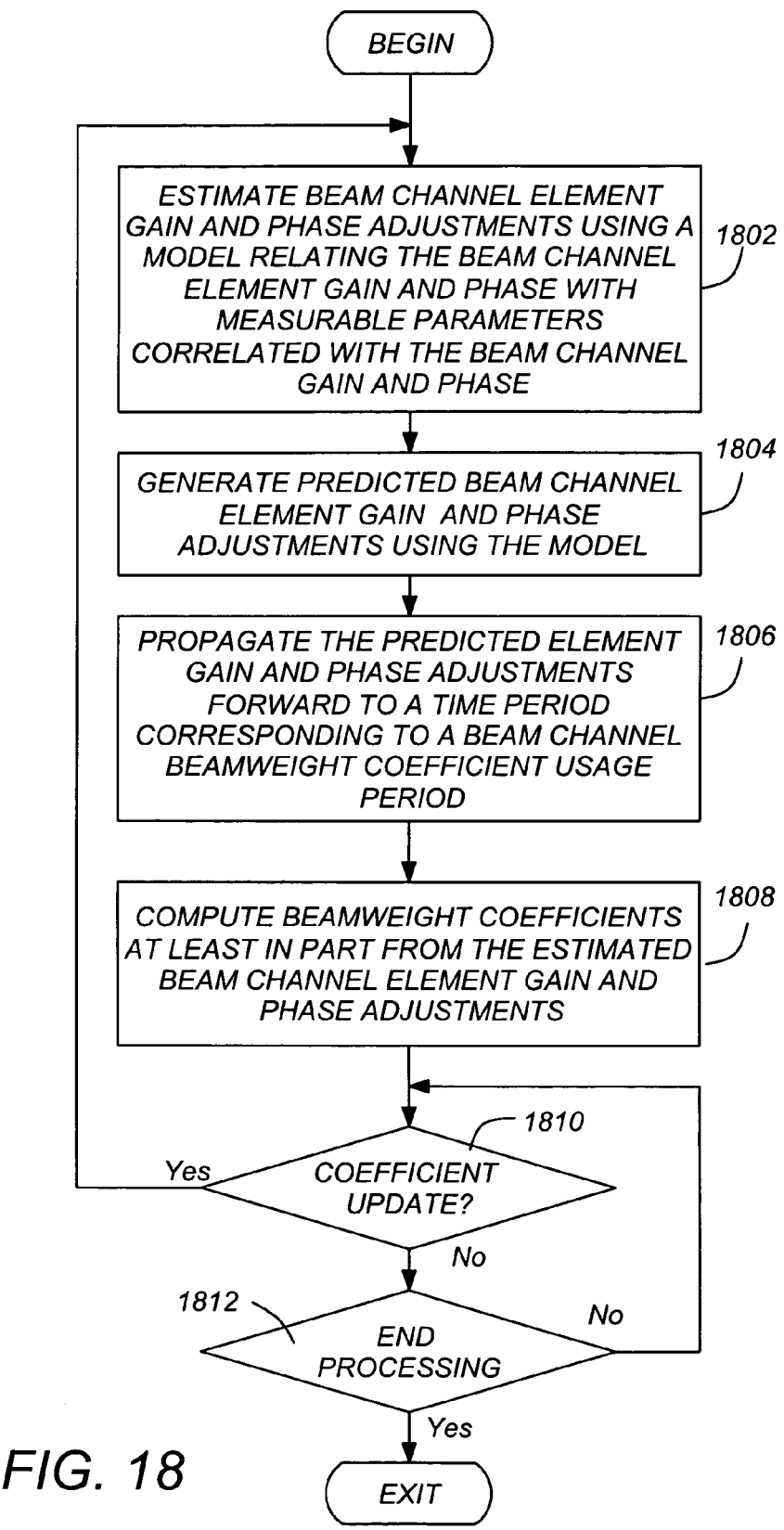
FIG. 18 is a flow chart illustrating how estimated and predicted element gain/phase characteristics can be used to reduce payload and beacon beam errors.

FIG. 18 is a flow chart illustrating how estimated and predicted element gain/phase characteristics can be used to reduce beam errors. In block 1802, beam channel gain and phase adjustments are estimated using a model relating the beam channel element gain and phase with measurable parameters that are correlated with the beam channel gain and phase. The estimated beam channel element gain and phase adjustments can be generated by filtering historical measurable parameter data (such as those discussed below). The historical measurable parameter data can include data from respective times in analogous periods, for example, the same time of day as days previous to the current day, data from the same day of the week as weeks previous to the current week, or the same day of the year as years previous to the current year. The historical measurable parameter data can include data relating the time 570, the Sun vector in the feed array coordinate frame 558, element traffic levels 536, sensed (or measured) element chain current 538 and sensed (or measured) element chain temperatures. The historical measured parameter data can include data for each element 402A-410A of the element chain(s), or for the aggregated payload system 306. The parametric model may also include factors relating to empiric diurnal corrections as well.

In one embodiment, this is accomplished by the element gain/phase prediction module 554 illustrated in FIG. 5. The gain/phase prediction module 554 can include a physical model (e.g. a model based on the underlying physics of the parameters on the gain/phase), or a non-physical parametric model with empirical descriptions of model parameters relating to one or more of the measurable parameters. In block 1804, beam channel element gain and phase adjustments are generated. This can be accomplished, as described above, by the element gain/phase prediction module 554.

In the illustrated embodiment, two sets of gain and phase predictions are generated. The first set, propagated gain/phase 510 is compared to element gain/phase adjustments 564 from the calibration logic 528 to form the measurement residual. Using a predictor/corrector estimation approach, the resulting measurement residuals are used by the estimate and model corrector 558 to produce estimate and model updates 561. The prediction module 554 also provides update gains (or Kalman gains) to the estimate and model corrector 558, using techniques such as those typically employed with a Kalman filter. This can be used to implement a design in which greater weight is placed on measurements for times of the day when the model prediction has proven to be less reliable and less weight on the measurements for a time of day when measurements are known to have more noise (e.g. when the solar arrays 104N and 104S cause multipath reflections into the calibration horns or beacon sensors 402). The estimate and model updates 561 include updates to the estimated element chain gains and phases and to any or all of the parameters in the module 554.

The second set of gain/phase predictions 556 from the module 554 are propagated forward to a time period corresponding to the beam channel beamweight coefficient upload, as shown in block 1806. Typically, the gain/phase predictions 556 are propagated forward to the center of the time period for which the beam coefficients 506, 508 will be used, however, the gain/phase predictions 556 can be propagated in time more or less than this value.

The foregoing data is provided to the beamweight quantizer 520, which computes beamweight coefficients 506, 508 at least in part from the estimated (and optionally propagated) beam channel element gain/phase adjustments 556. As shown in blocks 1810 and 1812, if it is time for a coefficient update, processing to block 1802.

The operations described in FIGS. 5-18 can be performed by hardware modules, dedicated to perform the described functions, or may be performed by one or more processors, communicatively coupled to a memory storing instructions implementing one or more software modules. For example, the element prediction module 554 is preferably implemented by a processor executing instructions performing the described operations. However, the element prediction module 554 may also be implemented in hardware, firmware, or both, with or without appurtenant software.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of correcting for beacon pointing errors, comprising the steps of:
   computing a desired beacon value;
   computing a predicted measured beacon value comprising the steps of
      generating beacon beamweights from data describing an orbit of a satellite;
      quantizing the generated beacon beamweights; and
      computng the predicted measured beacon value from the quantized generated beacon beamweights; and
   generating a beacon correction at least in part from the desired beacon value and the predicted measured beacon value.

2. The method of claim 1, wherein the beacon value comprises a beacon angle value.

3. The method of claim 2, wherein the step of generating a beacon correction at least in part from the desired beacon value and the predicted measured beacon value comprises the step of:
   generating the beacon correction at least in part as a difference between the desired measured beacon angle value and the predicted measured beacon angle value.

4. The method of claim 3 wherein the desired measured beacon angle value and the predicted measured beacon angle value are computed in a ground station using substantially identical instructions as those used to generate measured beacon angles from beacon beam values in a processor disposed on the satellite.

5. The method of claim 1, wherein the beacon value comprises a beacon beam value.

6. The method of claim 5, wherein the step of generating a beacon correction at least in part from the desired beacon value and the predicted measured beacon value comprises the step of:
   generating the beacon correction at least in part as a difference between the desired measured beacon beam value and the predicted measured beacon beam value.

7. The method of claim 6, wherein desired measured beacon beam value and the predicted measured beacon beam value are computed in a ground station using substantially identical instructions used to generate measured beacon beam values from beacon beamweights.

8. The method of claim 1, wherein:
   the desired beacon value is computed at least in part from satellite orbital data and a beacon location.

9. The method of claim 1, wherein:
   the steps of computing a desired beacon value, computing a predicted measured beacon value, and generating a beacon correction at least in part from the desired beacon value and the predicted measured beacon value is performed in a ground station controlling the satellite; and
   the method further comprises the step of transmitting the beacon correction from the ground station to the satellite.

10. The method of claim 1, wherein the step of generating beamweights from the satellite orbital data comprises the step of:
    selecting beacon beamweights from a table according to the satellite orbital data.

11. The method of claim 1, wherein the desired beacon value and the predicted measured beacon value are determined for a center of a time period for which the beacon correction is to be used.

12. An apparatus of correcting for beacon pointing errors, comprising:
   an antenna pattern calculator, for computing a predicted measured beacon value by generating beacon beamweights from data describing an orbit of a satellite, quantizing the generated beacon beamweights, and computing the predicted measured beacon value from the quantized generated beacon beamweights; and
   a beacon correction value generator, for computing a desired beacon value, and for generating a beacon correction at least in part from the desired beacon value and the predicted measured beacon beam value.

13. The apparatus of claim 12, wherein the beacon value is a beacon angle value.

14. The apparatus of claim 13, wherein the beacon correction value generator generates the beacon correction at least in part as a difference between the desired measured beacon angle value and the predicted measured beacon angle value.

15. The apparatus of claim 12, wherein the beacon value is a beacon beam value.

16. The apparatus of claim 15, wherein the beacon correction value generator generates the beacon correction at least in part as a difference between the desired measured beacon beam value and the predicted measured beacon beam value.

17. The apparatus of claim 12, wherein:
   the desired beacon value is computed at least in part from satellite orbital data and a beacon location.

18. The apparatus of claim 12, further comprising:
   a beamweight quantizer, for converting the generated beacon beamweights into quantized beamweights, the beamweight quantizer communicatively coupled to the antenna pattern calculator.

19. The apparatus of claim 18, further comprising:
   a beamweight table, for computing continuous beacon beamweights from satellite orbital data.

20. The apparatus of claim 12, wherein the desired beacon value and the predicted measured beacon beam value are determined for a center of a time period for which the beacon beam correction is to be used.

21. The apparatus of claim 12, wherein the antenna pattern calculator and beacon value generator are disposed in a ground station and the beacon correction is transmitted from the ground station to the satellite.

22. An apparatus for correcting for beacon pointing errors, comprising:
   means for computing a desired beacon value;
   means for computing a predicted measured beacon value, comprising
      means for generating beacon beamweights from data describing an orbit of a satellite;
      means for quantizing the generated beacon beamweights; and
      means for computing the predicted measured beacon value from the quantized generated bacon beamweights; and
   means for generating a beacon correction at least in part from the desired beacon value and the predicted measured beacon value.

23. The apparatus of claim 22, wherein the beacon value comprises a beacon angle value.

24. The apparatus of claim 23, wherein the means for generating a beacon correction at least in part from the desired beacon value and the predicted measured beacon value comprises:
   means for generating the beacon correction at least in part as a difference between the desired measured beacon angle value and the predicted measured beacon angle value.

25. The apparatus of claim 24 wherein the desired measure beacon angle value and the predicted measured beacon angle value are computed in a ground station using substantially identical instructions as those used to generate measured beacon angles from beacon beam values in a processor disposed on the satellite.

26. The apparatus of claim 22, wherein the beacon value comprises a beacon beam value.

27. The apparatus of claim 26, wherein the means for generating a beacon correction at least in part from the desired beacon value and the predicted measured beacon value comprises:
   means for generating the beacon correction at least in part as a difference between the desired measured beacon beam value and the predicted measured beacon beam value.

28. The apparatus of claim 27, wherein desired measured beacon beam value and the predicted measured beacon beam value are computed in a ground station using substantially identical instructions used to generate measured beacon beam values from beacon beamweights in the satellite.

29. The apparatus of claim 22, wherein:
   the desired beacon value is computed at least in part from satellite orbital data and a beacon location.

30. The apparatus of claim 22, wherein the means for generating beamweights from the satellite orbital data comprises:
   means for selecting beacon beamweights from a table according to the satellite orbital data.

31. The apparatus of claim 22, wherein the desired beacon value and the predicted measured beacon value are determined for a center of a time period for which the beacon correction is to be used.

32. The apparatus of claim 22, wherein:
   the means for computing the desired beacon value, the means for computing the predicted measured beacon value, and the means for generating a beacon correction at least in part from the desired beacon value and the predicted measured beacon value are disposed in a ground station; and
   the apparatus further comprises a means for transmitting the generated beacon correction to the satellite.

* * * * *